United States Patent
Bhargava et al.

(10) Patent No.: US 7,783,745 B1
(45) Date of Patent: Aug. 24, 2010

(54) DEFINING AND MONITORING BUSINESS RHYTHMS ASSOCIATED WITH PERFORMANCE OF WEB-ENABLED BUSINESS PROCESSES

(75) Inventors: Sunil Bhargava, Hillsborough, CA (US); Amitava K. Raha, San Jose, CA (US)

(73) Assignee: Entrust, Inc., Ottawa, ON (CA)

( * ) Notice: Subject to any disclaimer, the term of this patent is extended or adjusted under 35 U.S.C. 154(b) by 856 days.

(21) Appl. No.: 11/336,019

(22) Filed: Jan. 20, 2006

Related U.S. Application Data

(60) Provisional application No. 60/694,539, filed on Jun. 27, 2005.

(51) Int. Cl.
*G06F 15/173* (2006.01)
*G06F 11/00* (2006.01)
*G06F 15/02* (2006.01)

(52) U.S. Cl. .................. 709/224; 709/225; 709/226; 709/229; 714/37; 705/9

(58) Field of Classification Search ......... 709/201–203, 709/223–229; 707/205, 104, 3; 713/187; 714/37
See application file for complete search history.

(56) References Cited

U.S. PATENT DOCUMENTS

| | | | |
|---|---|---|---|
| 5,720,033 A | | 2/1998 | Deo |
| 6,157,707 A | | 12/2000 | Baulier et al. |
| 6,163,604 A | | 12/2000 | Baulier et al. |
| 6,178,511 B1 | | 1/2001 | Cohen et al. |
| 6,279,113 B1 | | 8/2001 | Vaidya |
| 6,327,677 B1 * | 12/2001 | Garg et al. .................... 714/37 |
| 6,363,411 B1 * | 3/2002 | Dugan et al. ................. 709/202 |
| 6,647,400 B1 * | 11/2003 | Moran ......................... 707/205 |
| 6,965,868 B1 * | 11/2005 | Bednarek ....................... 705/9 |
| 7,032,114 B1 * | 4/2006 | Moran ......................... 713/187 |
| 7,065,657 B1 * | 6/2006 | Moran ............................. 726/5 |
| 7,107,285 B2 * | 9/2006 | von Kaenel et al. ...... 707/104.1 |
| 7,379,882 B2 * | 5/2008 | Adams et al. .................. 705/1 |
| 7,610,327 B2 * | 10/2009 | Kryskow, Jr. ................ 709/200 |
| 2002/0038228 A1 * | 3/2002 | Waldorf et al. ................. 705/7 |
| 2004/0117358 A1 * | 6/2004 | von Kaenel et al. ........... 707/3 |
| 2004/0237077 A1 * | 11/2004 | Cole et al. .................. 717/162 |
| 2004/0260602 A1 * | 12/2004 | Nakaminami et al. ......... 705/11 |
| 2005/0172027 A1 * | 8/2005 | Castellanos et al. ......... 709/229 |

FOREIGN PATENT DOCUMENTS

EP 001408439 A1 * 4/2004

* cited by examiner

*Primary Examiner*—Wing F. Chan
*Assistant Examiner*—Razu A Miah
(74) *Attorney, Agent, or Firm*—Hickman Palermo Truong & Becker LLP

(57) ABSTRACT

Monitoring the operational performance of a network-based business service involves defining and detecting significant variances in activities associated with performance of the service. A business service is characterized by corresponding business rhythms, which are derived from patterns of metric values for business activities that are part of business processes corresponding to the business service. Each business rhythm is characterized as a set of statistics about the corresponding metric(s) classified for a period of time or over a group of multiple periods of time, statistically compressed, and persistently stored. For purposes of real-time monitoring of the operational performance of the business service, significant variances in the normal behavior of the business service are automatically detected by comparing real-time metric data with corresponding historical metric data, in view of associated threshold values.

36 Claims, 9 Drawing Sheets

DEFINING AND MONITORING BUSINESS RHYTHMS ASSOCIATED WITH PERFORMANCE OF WEB-ENABLED BUSINESS PROCESSES

CROSS REFERENCE TO RELATED APPLICATIONS

This application claims the benefit of domestic priority to U.S. Provisional Patent Application No. 60/694,539 filed on Jun. 27, 2005 and entitled "Defining and Monitoring Business Rhythms Associated With Performance of Electronic Business Services"; the entire content of which is incorporated by this reference in its entirety for all purposes as if fully disclosed herein.

FIELD OF THE INVENTION

The present invention relates generally to monitoring of web-enabled business processes and, more specifically, to quantitatively characterizing and monitoring business rhythms associated with activities that are performed in association with the performance of web-enabled business processes.

BACKGROUND

A Relationship Between Business Objectives and the State of Information Technology Operations Management Modern companies of all types are moving more and more of their day-to-day business processes onto the web. These web enabled business processes play a critical role in the success of the company. This trend calls for synergy between business and IT (Information Technology) operation managers where business strategies and objectives are distilled into the tangible information that can be used for understanding and monitoring business process and IT operational performance. Monitoring the experience of users interacting with these business processes and the relationship of those interactions with the consumption of supporting IT infrastructure resources is becoming extremely critical.

The dynamic nature of market forces and IT infrastructure (hardware and software) requires business and IT operations to align their objectives frequently. This results in frequent detailed requirements-gathering exercises. These exercises are expensive and error prone, due to the lack of solutions that properly quantify and align business objectives with the latest runtime operational requirements and performance. This inefficiency not only leads to frustration on the part of both business and IT managers, but also losses of revenue as business objectives are not fully realized. However difficult the process of keeping IT and business objectives aligned, the importance and benefits of monitoring the user experience and the state of the IT resources with respect to business objectives far outweigh the challenge.

Network Applications

More and more business processes are executed by software applications being developed and deployed in communications networks. These "network applications" are typically installed on some form of computing hardware connected to a network, such as application servers on the Internet. Such application servers provide a platform for deploying, executing, and managing sessions with the applications. Once deployed, users can initiate client-server sessions with the applications whereby the users and applications communicate over the network to conduct some type of business offered by the application. The services provided to users by an application are referred to as "business services" and have an underlying business process. Business processes are composed of various "business activities" that are performed in association with business processes that embody the business services. Business activities are performed in the context of conducting some type of business between users and the applications' owners (referred to herein simply as a "business").

The types of business activities that can be conducted between users (whether human or other applications) and network applications are practically limitless. Network applications can be developed to implement a few relatively simple business processes or many very complex business processes. Application users may be internal to a business, such as employees using an enterprise application, or external to the business, such as a customer or a partner of a business.

Regardless of the nature of the activity for which network applications are developed, the businesses deploying such applications are often concerned with many parameters associated with the activities being conducted via their applications. Such parameters may indicate information such as how, when, where and by whom their applications are being used, what is the level of service experienced by their customers, how their applications are performing, how the network infrastructure to which their applications are connected are performing, and the like. In light of the vast variations in network applications, in the types of business conducted via the applications, and in the types of activities performed with the applications, there is a widespread need for a tool for monitoring and detecting anomalous deviations in the performance of business services provided by network applications and associated IT resources.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENT(S)

Embodiments of the invention involve techniques for monitoring web-enabled business processes by defining a mechanism for understanding and learning the rhythms of the business (i.e., the "business rhythms"), then mapping this into tangible information that is used for monitoring performance of web-enabled business processes and the infrastructure supporting execution of the business processes.

Business services have an underlying business process. Of particular concern are web-enabled business services that are executed by business processes implemented by network applications. Business-impact metrics, i.e. all business related and IT infrastructure metrics that impact the operational performance of the business service, are monitored. Business rhythms can be viewed as operational signatures of the business service, that mathematically characterize the performance of the business service that is consistent with IT and Business operations. Business rhythms are discovered and then used to detect changes in the operational behavior of the business service. The operational behavior of a business service can be either at a per user level or at an aggregate user level.

General aspects of the invention comprise the following.

(A) The introduction of the concept of business rhythms to quantitatively characterize and monitor the health of web-enabled business processes that render a business service to the end-user. Business rhythms are qualitatively well-defined patterns observed in the values of key metrics and used to quantify the business process and the supporting IT infrastructure.

(B) Innovative techniques that allow the continuous monitoring, measuring and historical analysis of thousands of metrics. These metrics are domain-agnostic and cover the business as well as the IT domains.

(C) Data analysis algorithms that quantify the qualitatively known patterns of metrics. Patterns are quantified in terms of time periods and distribution of the metric for those time periods. Time periods are grouped into classes in which the statistical properties of the metric are the same for all time periods in a class. All such classes along with their time periods and metric distributions define the pattern or business rhythm. Any changes in the business rhythm is symptomatic of changes either in the performance or behavior of the IT applications implementing the process or in the effectiveness of the business process with respect to business objectives. Hence, rhythms form a formal measure to monitor and describe the effectiveness of the business process with respect to its execution.

(D) Techniques that allow for storage of large volume of metric values as well as associated rhythms in a compressed form. The data store used to store the data is self-maintaining and requires no maintenance, as opposed to traditional relational databases. This enables efficient mining of real network traffic data to discover metric patterns not previously known to exist. The data repository also enables users to access the metric value storage and manually discover metric patterns through flex charting.

(E) The system is self-learning and, therefore, algorithms dynamically adapt to changes in the underlying user traffic behavior or IT infrastructure.

(F) Techniques that allow for focused customer impact management. Continuous real-time metric monitoring and comparison with the expected rhythm allows raising of alerts whenever an anomaly is detected. The time interval when anomalous behavior was detected can be used to query the data storage for precise identification of the users and the business impact.

Techniques are described herein for quantitatively characterizing and monitoring business rhythms associated with activities that are performed in association with the performance of web-enabled business processes enabled by network applications (hereafter "applications"). Monitoring business rhythms is enabled by defining and detecting significant variances in activities associated with, or tasks performed by, such applications.

The term "business rhythm" is used herein to refer to a characterization of the performance of a business process in terms of the historical behavior of its metrics. These metrics include both business objective metrics as well as infrastructure metrics that impact the performance of the business process. These metrics are referred to herein as "business-impact" metrics. The term metrics and business-impact metrics are used interchangeably herein and each reference refers to business-impact metrics. For example, according to one embodiment of the invention, a business process is said to exhibit a rhythm if for a business-impact metric there exists a non-empty set of time windows where the behavior of the metric values within the set of time windows is similar, but different from the behavior of the metric values in a different set of time windows.

The rhythm of the business process is a collection of behavior patterns of one or more business-impact metrics. According to one embodiment, each business rhythm is represented as collections of sets of time windows and their associated statistics corresponding to the metric(s) from which the business rhythm is derived. Furthermore, each collection is associated with a statistical model that represents the set of time window statistics that forms the collection. The sets of statistics that characterize, or define, various business rhythms are efficiently stored in a data store. Thus, business rhythms can be decomposed into many different periods of time which, when analyzed, provide insight into past performance of corresponding business process. Expected correlations between different periods of time can be verified, and higher-level business rhythms discovered, by comparing the corresponding statistics from past performance of a business process.

For monitoring the performance of a business process, thresholds are associated with business rhythms. Performance of the business process is monitored by automatically detecting variances in the business process behavior characterized by an associated business rhythm. Such variances are caused by variances in the performance of corresponding business activities, as represented by the associated business-impact metrics. A significant variance in a business rhythm can be defined as a variance in the performance of one or more corresponding business activities that exceed an associated threshold. A corresponding action can be triggered in response to a significant variance in the performance of a business process.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

This application is related to U.S. patent application Ser. No. 10/952,599 filed Sep. 28, 2004 and entitled "Defining and Detecting Network Application Business Activities" (referred to herein as the "business signatures" reference); the entire content of which is incorporated by this reference in its entirety for all purposes as if fully disclosed herein.

Terminology Illustration

Figure 1:
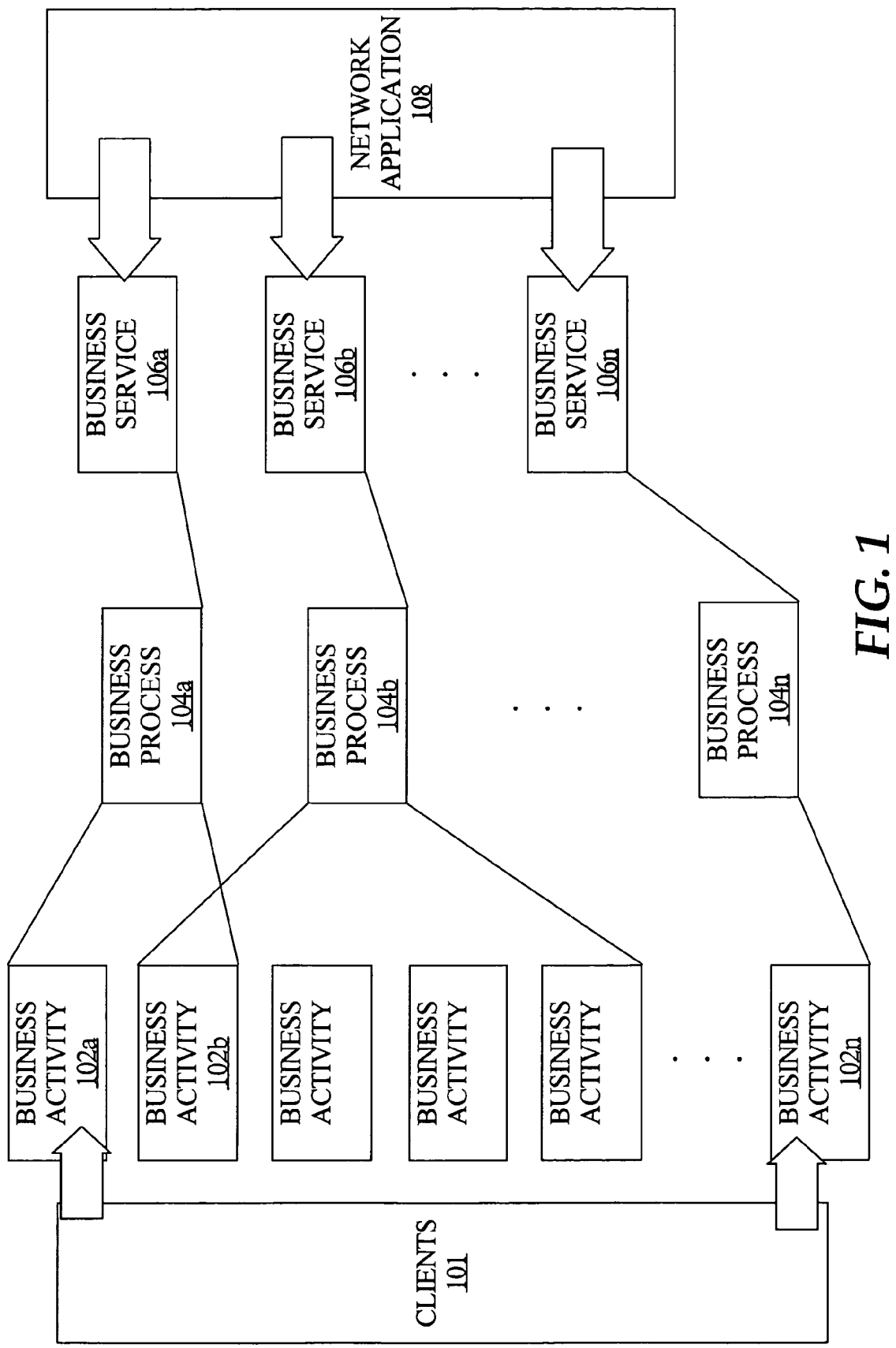
FIG. 1 is a block diagram that simply illustrates the relationship between what are referred to herein as business activities, business processes, and business services.

FIG. 1 is a block diagram that simply illustrates the relationship between what are referred to herein as "business activities," "business processes," and "business services." As illustrated, clients 101 and a network application 108 cooperatively perform one or more business activities 102a-102n in association with the performance of one or more business processes 104a-104n. Similarly, the performance of one or more business processes 104a-104n embodies the performance of one or more business services 106a-106n provided by the network application 108. Examples of these terms are described in greater detail herein.

The term "business activity" is used herein to refer to any activity or task performed in the process of conducting business using web-enabled applications. The performance of business activities constitutes the performance of the business processes enabled by such applications. Non-limiting examples of such business activities include "login" and "view my account." The term "business rhythm" is used herein to refer to a characterization of the performance of a business service in terms of the historical behavior of corresponding business process metrics. The metrics include both business objective metrics as well as any infrastructure metrics that impact the operational performance of the business process, collectively referred to herein as "business-impact metrics." The terms metrics and business-impact metrics are used interchangeably herein, with each referring to business-impact metrics.

Observations Regarding Web-Enabled Business Processes

Some key observations regarding web-enabled business processes, based on which techniques described herein are used to monitor web-enabled business processes and align business and IT operations, are as follows.

In a web-enabled business, users avail of the various services provided by the business by browsing the business web site. Each service provided to the user is associated with one or more underlying business processes. An execution path of the business process is determined by a user's traversal of the site's web pages.

An execution path of a business process can lead to an outcome that either meets or does not meet the desired business objectives. In practice, whether a business process execution path will lead to the meeting of a business objective depends either on the intent of the user's traversal, or the service quality experienced by the user while traversing the web site, or both. From the user's perspective, service quality is typically measured either in terms of the performance of the site (e.g., availability and responsiveness), or the efficiency of the underlying business process, or the look and feel of the site. Thus, by monitoring and analyzing end user execution paths, user intent can be tracked and impact of service quality detected. These metrics can then be correlated to the meeting of business objectives.

The business process execution paths are implemented by using IT resources (both hardware and network applications). Hence, utilization and performance of the IT resources impacts the execution process. By monitoring the IT resource metrics, the impact of infrastructure performance on the execution of the business process can be tracked. On the other hand, the impact of the execution paths on the utilization and performance of the IT resources can also be monitored. This two-way monitoring allows for quantitatively modeling the relationship between IT resources and business services and, in turn, the relationship between IT and business objectives.

Inherent in a web-enabled business is the large volume of users availing the various services provided by the business web site. As a result, at a typical business site a large number of execution paths are active during a given time period. This large sample size allows for accurate modeling of the expected behavior of the execution paths. Hence, the expected (normal) behavior of user access and the corresponding behavior of IT resources can be modeled. These behaviors are not static, or uniform and constant over time. Frequently, there is some pattern that these behaviors exhibit. These patterns can be based on a number of factors and periods. Irregularities in these patterns may or may not have much impact on the business. However, they might point to operational issues that need to be addressed.

Web-enabled businesses typically use HTTP as an underlying transport protocol. Hence, business metrics can be tracked without intrusive application instrumentation. On the other hand, IT metrics can be derived from IT management applications that are prevalent in the IT operations.

Business Services Overview

Figure 2:
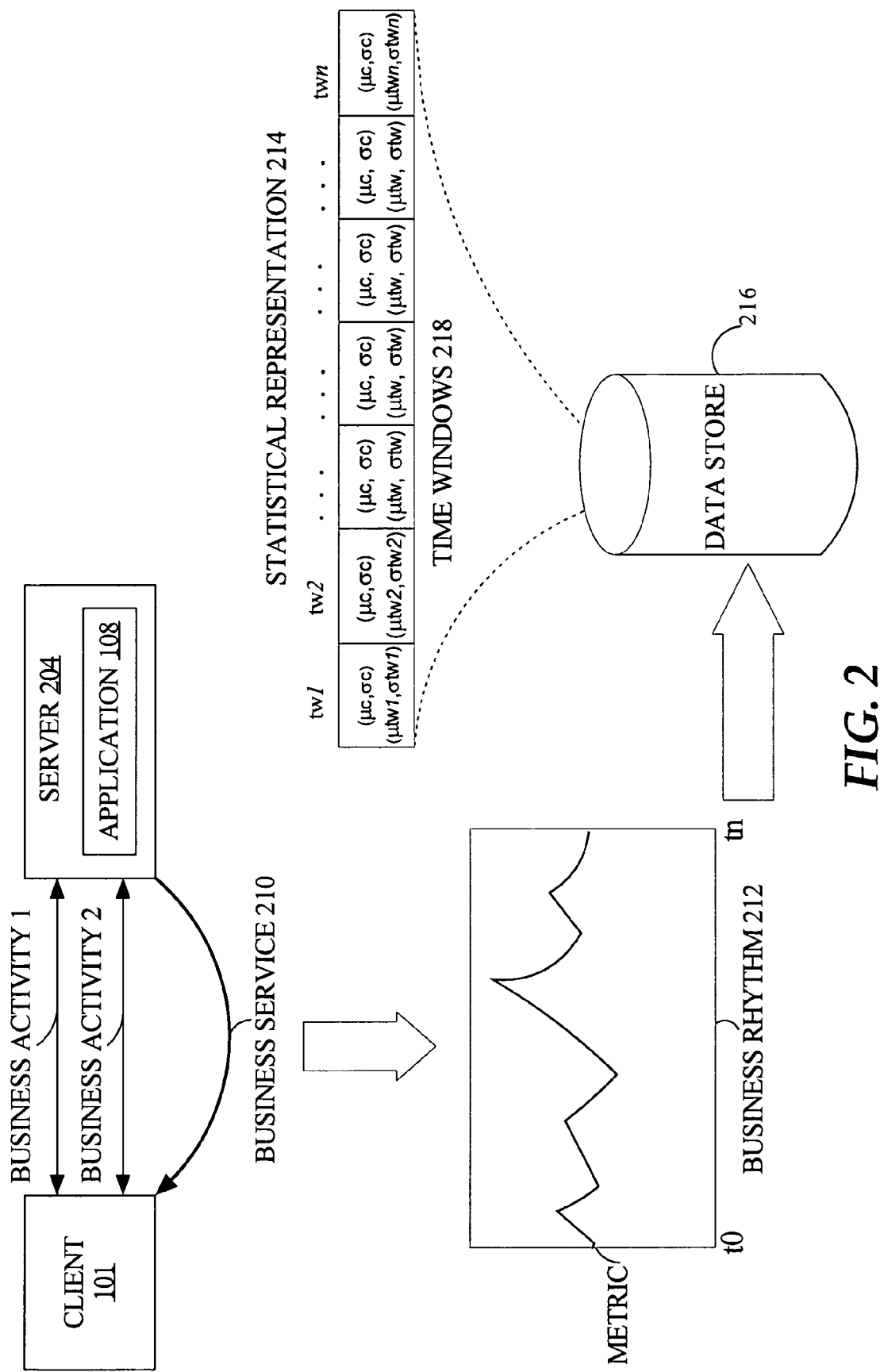
FIG. 2 is a block diagram that simply illustrates an operating environment in which an embodiment of the invention may be implemented, along with functional context.

FIG. 2 is a block diagram that simply illustrates an operating environment in which an embodiment of the invention may be implemented, along with functional context. A client 101 communicates via a network with a server 204, such as an application server, that is executing a network application 108. Communications between the client 101 and the server 204 are depicted, generally, as business activity 1 and business activity 2. For example, business activity 1 and business activity 2 may be evidenced by one or more request and/or response messages sent over the Internet using HTTP. For example, if the business activity is a "login" operation, the business activity may be evidenced by a login request from client 101 and a login confirmation response from server 204.

As discussed in reference to FIG. 2, business activity 1 and business activity 2 (e.g., business activities 102a-102n of FIG. 1) constitute one or more business processes (e.g., business processes 104a-104n of FIG. 1) that embody one or more business services (e.g., business services 106a-106n of FIG. 1) that are offered by application 108 and hosted by server 204. For example, business activity 1 and business activity 2 may be associated with a banking business service, such as a login request, a "view account" request, a login confirmation response, or a "display account" response, or some combination of such activities. Any purpose for communication between client 101 and application 108 via server 204 can be considered a business activity 102a-102n (FIG. 1) that contributes to performance of a business service 106a-106n (FIG. 1) offered by application 108.

FIG. 2 depicts that a business service 210, comprising one or more business activities (and/or other business services), may have a corresponding business rhythm 212. A statistical representation 214 of the business rhythm 212 is stored in a data store 216. Statistical representation 214 depicts a multi-level rhythm, according to one embodiment, where each of multiple time windows 218 (e.g., $tw_1$-$tw_n$) is associated with group, or 'cluster', statistics (e.g., $\mu_c$, $\mu_c$) as well as with their own statistics (e.g., $\mu_{tw}$, $\sigma_{tw}$). The concept of time windows being associated with group rhythm statistics and personal rhythm statistics is described in greater detail herein.

Business Rhythms Overview

The behavior of aspects of a business service can be characterized with business rhythms of the operational performance of the underlying business processes. In other words, business rhythms can be viewed as an operational signature of the business process that mathematically quantifies the performance of the business process from the perspective of both IT and Business operations. Because every business service has an underlying business process or processes, business rhythms are operational signatures of a business service. In turn, business rhythms are used to detect changes in the operational behavior of the business process and, therefore, changes in the operational behavior of a corresponding business service. The operational behavior of a business service can be either at a per-user level or at an aggregate user level.

A given business service may have associated business rhythms, as depicted in FIG. 2. A business rhythm, generally, comprises two aspects: (1) a set of time periods of the rhythm and (2) the metric that evidences the rhythm, either within the time period or in association with a group of time periods or both. A time period of a business rhythm may simply be related to the hour, day, week, month, etc. in which the rhythm manifests. On the other hand, the time periods in the business rhythm may be related to more complex contexts, such as the season of the year in which the rhythm manifests or the peak/off-peak period associated with a particular business type (e.g., retail business during year-end holiday period; banking business at common payroll times; income tax business leading up to "tax season"; and the like).

As described in reference to FIG. 2, a business rhythm can capture the macro-rhythm as well as the micro-rhythm. It is macro-level rhythm that allows for detection of, for example, seasonal patterns. For example, a macro-rhythm could classify time windows of a day as peak or off-peak hours. On the other hand, a micro-rhythm could be the distribution of the metric values for a given hour of the day. When business rhythms are determined, either both, one, or none of these rhythms may exist. In one embodiment, the quality of the metric's rhythm can be determined by ranking the rhythms of various metrics. For example, the presence of a macro-rhythm and a micro-rhythm is ranked higher than the presence of just a micro-rhythm or a macro-rhythm.

A business-impact metric that evidences a business rhythm may be any business-impact metric associated with a business process which shows some repeating pattern of behavior over a period of time. For non-limiting examples, suitable metrics include the rate at which an activity is performed, the volume of the activity, the response time associated with an activity, or a composite of two or more base metrics (e.g., a ratio of volume and response time). Generally, when referring to "metrics" herein, the term is intended to include base business-impact metrics as well as functions, such as ratios of these base metrics.

For example, in the context of an on-line auction site, a business rhythm may be identified, based on a metric corresponding to the number of bids placed, that shows that normal behavior is that the relative volume of bids placed on an item increases during the 15 minutes leading up to the end of the auction. For another example, a business rhythm may be identified based on a ratio of metrics corresponding to (a) the number of bids placed and (b) the final bid amount. This business rhythm may show that normal behavior is that the relative volume of the bids placed on an item during the 15 minutes leading up to the end of the auction is relative to the final bid amount, i.e., that fewer bids are typically placed during that 15 minute period for a relatively more costly item than for a relatively less costly item.

Business rhythms characterize the behavior of aspects of a business process. A business rhythm may be discovered by monitoring traffic between clients 101 and the application 108 running on the server 204. In addition, a business may speculate that certain business activities constitute a business rhythm with respect to a particular business process offered by application 108, i.e., that performance of the business activities form an identifiable and useful business pattern. Hence, this speculation can be confirmed or disproved by monitoring traffic between clients and the application.

Overview of an Adaptive Process for Monitoring Web-Enabled Business Operations

Building on the key observations discussed above, embodiments of the invention implement an innovative mechanism to monitor web-enabled business processes and align the business operations with IT operations. In practice, both business strategies and IT infrastructure change with time and market requirements. This fluidity of the domains calls for an adaptive and self-learning mechanism. Hence, embodiments of the invention implement an adaptive process that, when either triggered or periodically instantiated iterates through four general phases.

Figure 3:
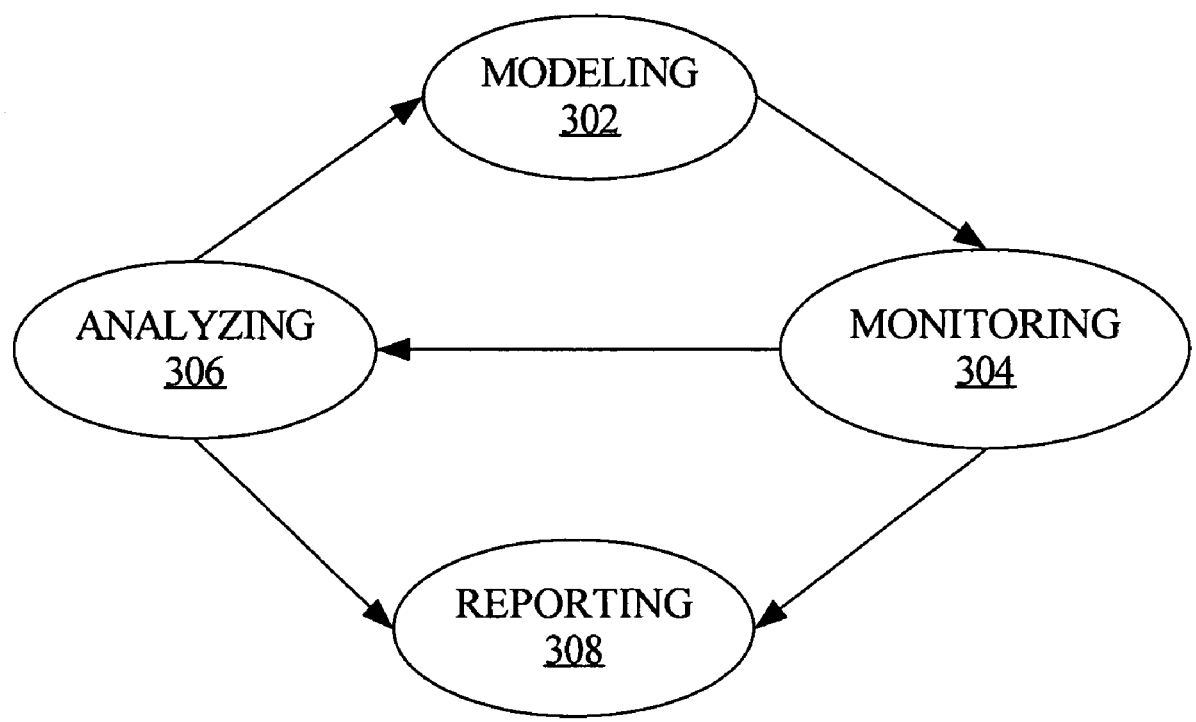
FIG. 3 is a block diagram that illustrates the interaction and transitions through which an adaptive process for monitoring web-enabled business operations iterates, according to an embodiment of the invention.

FIG. 3 is a block diagram that illustrates the interaction and transitions through which an adaptive process for monitoring web-enabled business process iterates, according to an embodiment of the invention.

Phase 1: Modeling 302

Initially, in this first phase, the user configures a base model. The base model is stored in a model repository, such as model repository 414 of FIG. 4. The base model comprises:

(a) a description of the business processes to be monitored, where a business process is modeled as a collection of business signatures, where a business signature specifies an HTTP hit (i.e., an HTTP request and HTTP response);

(b) a description of the IT resources associated with the business process; and (c) a description of custom user-defined business metrics of interest.

In subsequent iterations, the base model is updated and augmented by the results of analyzing the runtime data. For example, the base model may be updated with the threshold values used for alerting, with key metrics that display patterns, with definitions of these patterns and their time periods, etc.

Regarding factor (a) of the modeling phase, non-limiting techniques that may be used for monitoring network applications by defining and detecting business activities and corresponding business signatures are described in the "business signatures" reference.

Phase 2: Monitoring 304

The monitoring phase is a continuous process that monitors real time HTTP traffic and IT resource data. According to one embodiment, monitoring includes data collection and persistence, and alert generation.

For data collection and persistence, the collected data includes HTTP traffic data and IT resource data.

HTTP traffic data collection involves the following:

(a) dynamic construction of user execution paths, and monitoring associated metrics. One challenge met by embodiments of the invention is the construction and monitoring of user execution paths in real-time. Each business process execution path is based on a per-user traversal of some, or all, of the links that make up a business process. Hence, by its nature the execution path is dynamic and ever changing;

(b) dynamic extraction of business data from HTTP messages, and monitoring associated metrics;

(c) real-time extraction of basic HTTP traffic data, such as volume, faults, response times, and the like.

Figure 4:
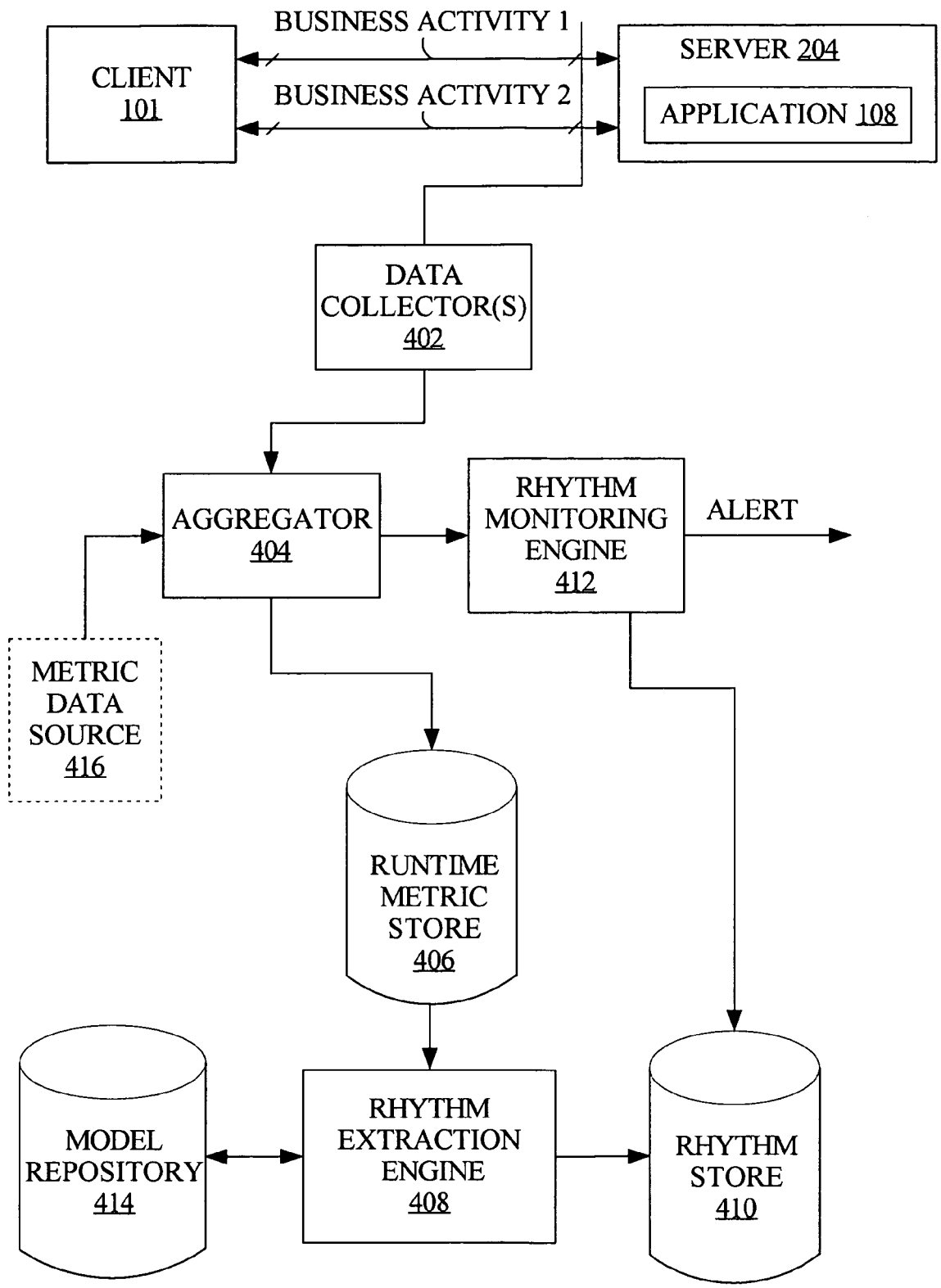
FIG. 4 is a block diagram that illustrates a business rhythms infrastructure in which an embodiment of the invention may be implemented.

A "traffic monitor" functional component is used to continuously mine HTTP messages from the wire (i.e., network) to extract, for example: HTTP traffic metrics, custom user-defined business metrics, and the statistics of the user execution path of business services. The real time metric values are compared with the associated rhythm (i.e., if the metric has exhibited a corresponding rhythm) for that metric stored in the model repository 414 (FIG. 4). The monitoring phase also includes generating alerts when the values of a metric deviates from the expected or normal behavior. Thus, the traffic monitor can be used to generate an alert upon detecting a variation between a monitored metric value and an expected value for the metric, in view of the rhythm of the metric. According to one embodiment, the traffic monitor functional component is implemented as part of a rhythm monitoring engine 412 (FIG. 4).

The collected data also includes IT resource data. The manner in which IT resource data is collected may vary from implementation to implementation. Thus, IT resource data is collected from any enterprise resource management interface. An "IT resource monitor" functional component is used to continuously monitor IT resource metrics, and stores this IT resource metric data in a real-time data repository. The real-time IT resource metric values are compared with the associated rhythm (i.e., if the metric has exhibited a corresponding rhythm) for that metric stored in the model repository 414 (FIG. 4). Thus, the IT resource monitor can be used to generate an alert upon detecting a variation between a monitored IT resource metric value and an expected value for the metric, in view of the rhythm of the metric. According to one embodiment, the traffic monitor functional component is implemented as part of a rhythm monitoring engine 412 (FIG. 4).

According to one embodiment, a "real-time metric data repository" functional component is used to store, in a compressed form, real time data collected by the HTTP traffic monitor and the IT resource monitor. The compressed form, discussed in greater detail hereafter, allows for efficient mining of the data to determine metric values and distribution of these values across any timeframe. Furthermore, according to one embodiment, the metric values collected from various processes and resources across an enterprise are synchronized with a virtual clock, which allows metrics from different entities distributed over the business to be compared.

Phase 3: Analyzing 306

The analyzing phase includes analyzing historical data collected and stored during the monitoring phase. The analyzing phase is instantiated by events and/or periodically. The output of data analysis, in the analyzing phase, (a) determines the metrics that show patterns or rhythmic behavior;

(b) characterizes the identified patterns in terms of time periods with which the patterns are associated and the statistical properties of the patterns; and (c) updates the model with the learned data.

According to one embodiment, an "analyzer" functional component is used to periodically (or on demand) mine historical data to determine the quantitative measure of metric patterns, if there are any. The analyzer component also updates the model repository 414 (FIG. 4) with any new patterns associated with respective metrics.

Phase 4: Reporting 308

The reporting phase reports the status of various business processes and associated IT resources. The metric values collected in the monitoring phase are also reported and graphed in this phase. According to one embodiment, a "reporting" functional component provides access to the real-time data repository, and can be used for generating reports and/or graphs. The reporting component also provides access to the status of a metric. According to one embodiment, the status of a metric can be either CLEAR, WARN, SEVERE or CRITICAL, where the metric value determines the status.

Infrastructure and Corresponding Component Functionality

FIG. 4 is a block diagram that illustrates a business rhythms infrastructure in which an embodiment of the invention may be implemented. In FIG. 4, functional components may be implemented as software, i.e., as sequences of instructions which, when executed by one or more processors, cause the processors to perform certain steps. Functional components implemented as software execute on one or more computers or machines, such as computer system 800 of FIG. 8. In FIG. 4, data repositories and stores may be implemented in a conventional database or other data storage systems.

Metric Collection

Runtime metric store 406 stores and manages the values of metrics collected from the HTTP traffic and IT resources at run time. Any metric that can be extracted from the HTTP traffic intercepted by data collectors 402, are eligible for rhythm analysis. The metrics include, but are not limited to the following.

(a) HTTP traffic metrics. Non-limiting examples of traffic metrics include the following:

Hit characteristics (e.g., number of hits, number of faults, etc.);

End user characteristics (e.g., number of registered users, number of users, etc.);

Session characteristics (e.g., session duration statistics, etc.); and

Response time characteristics.

(b) HTTP traffic metrics pertaining to, but not limited to, specific business signatures. These traffic metrics cover all metrics covered in (a), but pertaining to hits for specific business signatures identified in the traffic. For example, the metrics could be specific to all signature hits of type "site-logins", "account-lookup" or "transfer-money", etc.

(c) Content metrics. These content metrics are metrics that monitor information extracted from the HTTP message. For example, in the case of an online retail business, one could monitor the sale amount embedded in the hit of type "add-tocart", and in the case of a bank, one could monitor the amount transferred to or from an account.

(d) Derived metrics. These derived metrics are derived by evaluating expressions involving the metrics discussed in (a), (b), and (c). The ratio of the number of hits of type "add-to-cart" to the number of hits of type "login" is a non-limiting example of a derived metric.

According to one embodiment, the system monitors all HTTP traffic to a website (i.e., to a network application) all the time. Availability of metric values of the site in real-time is critical in determining the real-time behavior of the business. Further, there can be thousands of metrics whose values are extracted from the HTTP traffic. This combination of a large number of metrics and real-time collection generates a large volume of data for monitoring.

One or more data collectors 402 operate to collect network traffic from respective servers, server farms, or websites. The HTTP traffic is processed at the data collectors 402 and relevant metric values are extracted. These metric values are then periodically sent to the data aggregator 404. The time interval between each data update to the data aggregator 404 is configurable and can be tuned to business needs. The data aggregator 404 aggregates the data from all the sources and periodically stores the data in runtime metric store 406.

The manner in which aggregator 404 receives information about the performance of various business activities may vary from implementation to implementation. For example, data collectors 402 may be communicatively coupled to the network, or to server 204, to monitor business activity-related data (e.g., network traffic information) from which business activities can be identified.

In one embodiment, data collectors 402 identify the occurrence of business activities from network traffic, based on the extraction of information from the HTTP messages. The information to be extracted from the HTTP messages is configured based on business activities to be monitored and characterized. In one embodiment, approaches to identifying business activities are based on business signatures, which approaches may be used in conjunction with or as part of the data collectors 402 and/or rhythm extraction engine 408 to implement embodiments described herein, are described in the "business signatures" reference, U.S. patent application Ser. No. 10/952,599.

In one embodiment, aggregator 404 is, additionally or alternatively, communicatively coupled to a metric data source 416 for receiving business activity-related data, such as metric values regarding past performance of business activities. The type of metric data source 416 from which aggregator 404 receives metric data is virtually limitless. For example, aggregator 404 may obtain business activity metric data directly from the business that is using application 108 to conduct business, or from the server 204 that is hosting the application 108 that provides business services.

To determine business rhythms, the system requires storing metric distributions over various time intervals. According to one embodiment, the distribution data is stored in the runtime metric store 406 once every hour, where the unit time interval in the system starts at the hour boundary and ends at the hour boundary. The distribution across multiple time units is derived by combining the data stored in each time unit.

Additionally, business patterns or rhythms emerge over various time intervals that could extend over a day, a month, a quarter or a year. Hence, this requires that information about the collected data must be stored for a considerable amount of time. The data size and the duration of the rhythms lead to a large amount of data that needs to be stored and analyzed. Storing and analyzing such large quantities of data is challenging. According to one embodiment, to improve efficiency of analysis and storage, the system stores only the information pertaining to the behavior of the metrics and this information is used to determine rhythms.

Business Rhythm Distributions

According to one embodiment, the first and second moments of the metric distributions are stored. Storing information pertaining to the first and second moments of the distribution gives a wide coverage. For instance, the nature of the domain described herein results in the distribution of the observed business-impact metrics to be Gaussian. To efficiently compute the moments of the distribution parameters of the metrics, according to one embodiment, information stored in the metric store 406 includes: (a) sample size, (b) minimum sample value, (c) maximum sample value, (d) sum of sample values and (e) sum of the squares of the sample values. Storage of these parameters allows the system to determine the distribution across various time units. According to one embodiment, this data is stored in a circular format such that the newest entries automatically overwrite the oldest entries. The maximum number of entries in the circular store determines the number of continuous time units that is available at any time. According to one embodiment, the maximum number entries for continuous time units in the system is 8760, i.e., one year of one hour distributions can be stored before a unit is overwritten.

Business rhythms can include patterns that manifest themselves over days, weeks or months. Thus, to determine rhythms over these intervals, the system requires distributions over a day, a week and a month. To increase the efficiency and performance of the rhythm extraction system, the data management system maintains three additional circular stores: one each to store the distributions for days, weeks and months, respectively. The data management system uses the data values stored in the 1-hour circular runtime metric store 406 to derive the values for the 1-day, 1-week and 1-month time units, which are then used to populate the remaining three data stores. The values of the 1-day, 1-week and 1-month data stores are automatically determined and stored by the data store at run time. For example, after 24 rows (corresponding to the last 24 hours) are available in the 1-hour store, the system automatically computes and stores a row in the 1-day data store. Similarly, the 1-week data row is available after 7 rows in the 1-day store are stored.

How the data for 1-day, 1-week and 1-month time intervals is derived from the 1-hour data, is as follows. Let $n_i$, $sum_i$, $min_i$, $max_i$, and $sumSquares_i$ be the data stored in the ith row of the 1-hour circular store. The relation between 1-hour data and 1-day or 1-week data is presented in Table 1.

TABLE 1

Relationship between 1-hour data and 1-day data

| Condition | Data Stored |
|---|---|
| If i is last hour of day | $N_{1day} = \Sigma_i^{1-23} n_i$<br>$Sum_{1day} = \Sigma_1^{i-23} sum_i$<br>$SumSquares_{1day} = \Sigma_i^{1-23} sumSquares_i$<br>$Min_{1day} = min_i^{1-23}(n_i)$<br>$max_{1day} = max_i^{1-23}(n_i)$ |
| If i is last hour of last day of the week | $N_{1week} = \Sigma_i^{i-167} n_i$<br>$Sum_{1week} = \Sigma_1^{i-167} sum_i$<br>$SumSquares_{1week} = \Sigma_i^{1-167} sumSquares_i$<br>$Min_{1week} = min_i^{1-167}(n_i)$<br>$Max_{1day} = max_i^{1-167}(n_i)$ |

According to one embodiment, the computations of the algebraic equations shown in Table 1 are optimized as follows. To compute 1-week data, the values for the last six rows of the 1-day circular store and the last 24 rows in the 1-hour circular store are summed. Computation of the 1-month data is also optimized similarly to as described for the 1-week data. Furthermore, the system accounts for the fact that the number of days in each month changes.

A business rhythm is represented in a useful, scalable and efficient manner by compacting the values of the metric over time. The compression is achieved by extraction of the information about the metric's behavior and storing this as a statistical representation. A business rhythm may be represented as collection or grouping of time windows, where each group has a representative distribution and each time window within the group has a representative distribution. A classification technique is used to determine the group membership of a time window. The classification technique is described in greater detail herein. The statistical representations of the business rhythms are stored in a data repository, the rhythm store 410, for subsequent use. For example, stored business rhythms are compared with ongoing traffic between client 101 and application 108 to detect any significant variances in the corresponding business rhythms.

As mentioned, because the period of time over which a business rhythm manifests itself varies, the rhythm store 410 provides a vast repository of statistical representations of the behavior of a business service over many different periods of time, as embodied by performance of associated business activities and as represented by corresponding metrics. For example, each statistical representation can be organized and stored logically in a grid format, wherein each representation represents a cell in the grid. For non-limiting examples, (1) a "day grid" may be a 1×24 array (with each cell representing an hour of a day); (2) a "week grid" may be a 7×24 grid (with each cell representing an hour of a day of a week) or a 1×7 grid (with each cell representing a day of a week); and so on. The granularity of, and time period over which, statistical representations of business rhythms can be organized and stored is virtually limitless, and can be specified to meet particular needs of a given business-user.

Characterizing the Operational Behavior of a Business Service by Identifying Temporal Patterns in Business Activities that Correspond to the Business Service As mentioned, the behavior of aspects of a business service can be characterized with business rhythms of the operational performance of the underlying business process. Identifying business rhythms for a business process involves the discovery and identification of flows or patterns associated with business activities that correspond to the business service. Discovering, and detecting variances in, business rhythms is an effective way of gaining knowledge as to how a business is operating with respect to the network-based business services that it provides. A given metric that corresponds with a business activity may or may not have a rhythm, which may or may not be consistent with the presence of a rhythm in the underlying business activity. In other words, the performances of some business activities over time do not manifest in any discernable rhythm, and for business activities whose performance over time do manifest in a discernable rhythm, the rhythm may not be discernable with certain metrics. Hence, there is a challenge to choosing appropriate metrics and/or business activities to use, in the context of business rhythms, to gain insight into the performance of a corresponding business service.

For example, a purchasing pattern at a given retail website is not likely discernable from simply monitoring a metric that represents the number of logins to the site or the number of "request checkout" activities to the site. A metric that is more likely to show a reasonable relationship to the purchasing pattern might be a metric that represents the number of final "submit order" activities performed through the site. For another example, a significant pattern of load on an account database server at a given banking website may not be recognized or discovered based on monitoring a metric that represents the number of requests, received by the site, to view account information. A metric that might more likely show what would be considered a significant load on the server is a metric that represents the number of requests to transfer money from one account to another, which results in a more significant load on the server than a simple account query.

Similarly, it is a challenge to determine an appropriate time period in which to characterize the performance of a business activity, in order to recognize an actual pattern in the past performance of the business activity. Patterns in business activities may or may not emerge when analyzing such activities, depending on the time period in which the activities are analyzed. The discovery and significance of any type of pattern in an object is relevant to the view from which the object is inspected, and discovering patterns or rhythms in business activities is no exception.

Extracting Rhythms from Stored Metric Values

A process for identifying patterns in performance of business activities involves analysis of historical data that represents performance of such activities, such as real-time or stored values for metrics that correspond to business activities. Therefore, identifying patterns in values for metrics, or in ratios of the values for two metrics, furthers the purpose of identifying patterns in the performance of business activities. As discussed, patterns may manifest in single metrics (i.e., performance of a single activity) or functions of metrics (e.g., ratios of the performance of two activities).

Figure 5:
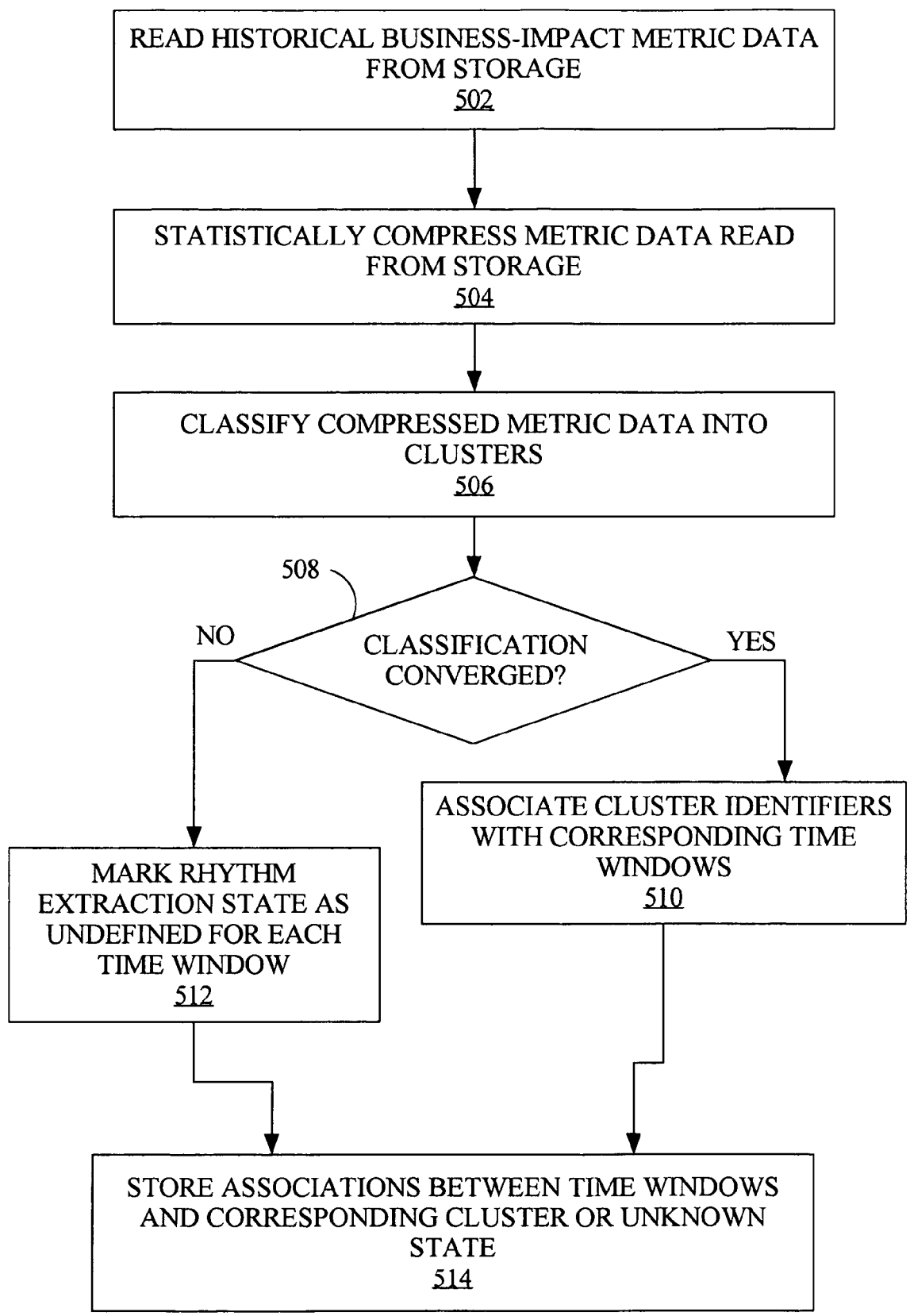
FIG. 5 is a flow diagram that illustrates a process for extracting business rhythms from stored metric values that represent business activities, according to an embodiment of the invention.

The rhythm extraction engine 408 is a system component that is executed periodically, or on demand. FIG. 5 is a flow diagram that illustrates a process for extracting business rhythms from stored metric values that represent business activities, according to an embodiment of the invention. According to one embodiment, the process depicted in FIG. 5 is implemented as software, i.e., as sequences of instructions which, when executed by one or more processors, cause the processors to perform certain steps. A software implementation executes on one or more computers or machines, such as computer system 800 of FIG. 8. For purposes of clarity and conciseness, the rhythm extraction process is described by describing the steps of extracting rhythms from hourly data; however, embodiments are not limited to use of the hourly data.

At block 502, historical business-impact metric data is read from a store. For example, the rhythm extraction engine 408 (FIG. 4) reads historical data about business activities that is stored in the runtime metric store 406 (FIG. 4). Due to the large volume of HTTP traffic hitting a typical business site, it is assumed that the metric distribution is Gaussian with parameters $\mu$ and $\sigma$. The values of $\mu$ and $\sigma$ are computed from the runtime data store 406 as follows.

The parameters $\mu_{i,j}$ and $\sigma_{i,j}$ for data sampled during hours i and j is computed as follows, $$\mu_{i,j} = (\text{sum}_i + \text{sum}_j)/(n_i + n_j)$$

$$\sigma^2_{i,j} = (1/(n_i + n_j 1))((\text{sumSquares}_i + \text{sumSquares}_j) - (\text{sum}_i + \text{sum}_j)^2/(n_i + n_j))$$

The nature of the information and the manner in which the information is stored in the data store allows for efficient evaluation of the foregoing formulas over any number of hour intervals.

At block 504, the metric data is pre-processed for classification, by using the foregoing formulas to compress the historical data read from the 1-hour circular store to a compressed format for use as input to a clustering algorithm used for classification. According to one embodiment, at the pre-processing stage the historical metric data is compressed to 168 (24 hours*7 days) data points. The clustering algorithm then classifies the 168 data points into three groups, referred to herein as C1, C2, and C3. In this embodiment, three groups were chosen because the business operations domain is typically partitioned into three activity regions: peak, medium and low. However, the number of data points into which the historical metric data is compressed and the number of clusters into which the metric data is clustered can vary from implementation to implementation. Each cluster or group is a model that has a representative distribution with parameters $(\mu_{C_i}, \sigma_{C_i})$.

At block 506, the compressed data is classified into clusters, i.e., the data is grouped. According to one embodiment, for clustering of the metric distributions a derivation of the relative cross entropy is used as a theoretic measure for the distance between the two probability distributions. Relative cross entropy (also referred to as the Kullback-Leibler (KL) distance and Kullback Leibler divergence) is a theoretic measure for the distance between the two probability distributions. Topics relating to Kullback-Liebler divergence are described in "On information and sufficiency" by S. Kullback and R. A. Leibler, from *Annals of Mathematical Statistics* 22(1):79-86, March 1951, the content of which is incorporated by this reference in its entirety for all purposes as if fully disclosed herein.

According to one embodiment, a partitioning clustering algorithm is used to determine the clusters. In the clustering algorithm the distance between two data points, i and j is computed using the following equation:

$$\Delta i,j = \sigma^2_i/\sigma^2_j + \sigma^2_j/\sigma^2_i + (\mu_i - \mu_j)^2 * (1/\sigma^2_j + 1/\sigma^2_i).$$

The clustering algorithm is an iterative algorithm in which the stopping condition is either the number of iterations or when the clusters do not change, i.e., the cluster classification converges. At decision block 508, it is determined whether the clustering classification algorithm converged. If the algorithm converged at block 508 (i.e., if the algorithm terminates when the clusters stabilize), then cluster identifiers are associated with each corresponding time window (e.g., in the 24*7 grid matrix) accordingly, at block 510. The implication is that distinct repeatable patterns were detected for the metric. Hence, the business can be characterized by a distinct rhythm which is represented by the set of cluster-time window associations.

On the other hand, if the algorithm did not converge at block 508 (i.e., if the clustering algorithm terminates because the number of iterations exceeds the maximum number specified), then the rhythm extraction state is marked as undefined, at block 512. The implication here is that no repeatable patterns that can be grouped into the defined groups are detected for the metric. One way to consider an undefined rhythm extraction state is that there are 168 groups of patterns corresponding to the 168 time windows of metrics where each time window is a unique class of compressed data item. Whether a rhythm is detected and characterized by the cluster-time window association, or whether the state is undefined, the resulting information is stored persistently in the rhythm store 410 (FIG. 4), at block 514.

Because the foregoing approach could be computationally expensive in light of the potentially large number of metrics for a given business service and the much larger number of ratios of metrics, according to one embodiment, rhythm extraction engine 408 (FIG. 4) is capable of accepting "hints" as to what metrics are expected to show identifiable patterns and/or what metrics are likely to be a valuable model of the operational behavior of an aspect of the business service and, therefore, worth monitoring. The use of hints narrows the domain of information that is analyzed in search of patterns, and may originate from the business providing the business service.

According to one embodiment, after the clustering phase, the rhythm extraction engine 408 (FIG. 4) performs post-process analysis to rank the rhythms with respect to the rhythms' usefulness as a tool for monitoring the behavior of a business process. The higher the rank, the better is the ability of the rhythm to characterize the normal behavior of a business process. In one embodiment, candidate rhythms are ranked based on the inter-cluster distance as well as the intra-cluster dispersion. In general, better candidates have relatively larger inter-cluster and smaller intra-cluster dispersion. In one embodiment, a function of the KL distance and Fisher's ratio is used to measure inter-cluster dispersion, where Fisher's ratio is a measure for (linear) discriminating power of some variable, as follows. Fisher's ratio=$(\mu_1-\mu_2)^2/(\sigma_1+\sigma_2)$, with $\mu_1$ and $\mu_2$ being the means of class 1 and class 2, and $\sigma_1$ and $\sigma_2$ the variances.

According to one embodiment, to assist the user with selecting the candidate process metrics, the system provides the user the capability to graph metrics using flex charting and view the behavior in time windows associated with different clusters.

Storing Business Rhythm Representations

As described above, in one embodiment, each business rhythm is represented in a compressed statistical form as a set of values for pertinent statistical parameters. Based on different temporal views of the historical behavior of a business activity associated with a metric, one or more logical arrays or grids of values can be generated and stored in a data store, such as rhythm store 410 (FIG. 4), for each metric that is associated with an established business rhythm.

The output of the rhythm extraction engine 408 (FIG. 4) is stored in the rhythm store 410 (FIG. 4). According to one embodiment, the rhythm store 410 is a circular store, similar in that aspect to runtime metric store 406 (FIG. 4). According to one embodiment, the rhythm store 410 stores two lists of rhythm information per metric, that is, an active list and a suggestion list. The active list is to be used by the rhythm monitoring engine 412 (FIG. 4) and the suggestion list contains the output of the rhythm extraction engine 408. This allows users the flexibility and opportunity to apply domain knowledge information on the output of the rhythm extraction engine 408.

According to one embodiment, the historical data in its uncompressed form is also stored and maintained in a separate data repository for a period of time, i.e., in a circular store such as used with runtime metric store 406 (FIG. 4). This uncompressed data can be used for analyzing the performance of the business service or of the hosting system at single points in time, rather than over a period of time as with business rhythms.

Analyzing and Monitoring Business Rhythms

Once business rhythms are identified, represented and stored in an efficient, scalable manner in a data store as described herein, the business rhythms can be analyzed for numerous purposes. In the context of storing the business rhythm statistical representations in a grid of data, any two cells of the grid can be compared, using conventional similarity functions. For example, a "birds-eye" analysis of a given business rhythm may be used to discover, for non-limiting examples, peak and off-peak periods and associated patterns, seasonality patterns, correlations among metrics, and the like. Because a web-enabled business using the Internet does not necessarily follow a static pattern of a historically typical work-week, the periodic dynamic analysis of business rhythms adjusts to periodic changes in the implementation of the business process and provides insight into what might be a typical, noteworthy and useful period of performance for that implementation of the web-enabled business service.

The rhythm monitoring engine 412 (FIG. 4) monitors the real time data seen by the aggregator 404 (FIG. 4). Generally, if the metric values deviate significantly from the latest store in the active list of the rhythm store 410 (FIG. 4), then an alert may be generated. The metrics of interest can be configured in the rhythm monitoring engine 412. Furthermore, the rhythm monitoring engine 412 allows users to define the deviation acceptable for each alert level.

Contextual Aspects of Business Rhythms

Operational behaviors of a business service that might be considered significant in one context may not be considered significant in other contexts. For example, an on-line auction provider may be aware that, historically, the number of bids increases significantly during a certain period of time leading up to the end of the auction (where the period of time may actually be discovered by analyzing pertinent business rhythm metrics). Hence, the auction provider would likely consider an increase in the number of bids during a period of time leading to the end of auctions as normal behavior and would not likely consider this type of behavior a significant enough event to trigger a corresponding alert. In this scenario, the auction provider may consider a less than normal increase in the number of bids during that time to be a significant variance. In general, whether or not a variation in a business activity metric is considered significant enough to warrant an alert or other action depends on the contextual "environment" in which the business activity is being performed.

Some contextual aspects of a business rhythm may not be as easily identified as the example described in reference to an on-line auction provider. Thus, analysis of the business rhythms associated with combinations of respective metrics, such as analysis of the statistical representations stored in the data store, may be beneficial in discovering and understanding relationships among various groups of metrics, and/or to confirm an expected relation between business rhythm metrics. For example, in the on-line auction context, it may be suspected that the relative increase in the number of bids when approaching end of an auction may be related to the cost of the item being auctioned. Therefore, historical data for these metrics can be analyzed in relation to each other to confirm whether or not that suspicion holds true. For another example, in the banking service provider context, it may be suspected that a business rhythm metric m1 defined as the number of login operations divided by the number of requests to view an account is somehow related to the number of customers m2. Therefore, historical data for these metrics can be analyzed in relation to each other to determine, for example, that when the number of customers is less than one hundred, there is probability p that m1 will surpass a certain value.

Thus, any number of different metrics can be analyzed in relation to each other to determine whether an actual operational relationship exists. That is, reviewing the probability that given X, Y occurs, can be beneficial in understanding what metrics and what corresponding business activities are worth monitoring, and what variances in such metrics are significant enough to be of interest to the business service provider. Generally, such trans-metric analyses benefit business service providers by helping the providers determine the actual usage of their resources (i.e., their business service and corresponding IT resources), and any effects that such usage may have on their IT infrastructure, either directly or indirectly.

Establishing Thresholds to Define Significant Variances

According to one embodiment, one or more threshold values are stored in association with corresponding business rhythms, for purposes of monitoring the performance of a business service and triggering corresponding actions in response to a variance in the performance. Performance of the business service is monitored by automatically detecting variances in associated business rhythms (e.g., by rhythm monitoring engine 412 of FIG. 4). Variances in business rhythms typically indicate variances in the performance of corresponding business service, since the underlying business process serve as the basis of the metrics associated with the business rhythms.

A significant variance in a business rhythm can be defined as a variance in the performance of a corresponding business service. A variance in a business rhythm is said to occur if any of the following two events are detected in real-time. In the first event, the values of the metric deviates from the typical values associated with the time period. In the second event, the values of the metric for the time period (window) is such that it appears to be closer to a cluster group not associated with the time window. For each of the two events, thresholds can be associated to quantify the degree of variance. When the variance in the business activity exceeds an associated threshold, a corresponding action can then be triggered, if desired, in response to the significant variance.

The manner in which appropriate thresholds to apply to a given business rhythm are determined, can vary from implementation to implementation and from use to use. Thresholds can simply be user-specified, such as by the business service provider. In addition, statistical information about the historical performance of a given business activity can be used to determine an appropriate threshold to associate with the corresponding business rhythm metric.

In one embodiment, thresholds are determined as part of a procedure for identifying business rhythms. For detecting variations in which the values of the metric deviate from the typical values associated with the time period, an appropriate threshold can be based on the probability (based on historical data) that a value for the metric will exceed a threshold. Assume that a 10% probability is specified (e.g., by the business service provider) as a reasonable and useful level for triggering an action in response to detecting a value that surpasses a theoretical threshold. In other words, that provider is not interested in reacting to a variance in a business activity unless the variance exceeds what is considered normal behavior, which historically occurs 90% of the time. Then, real thresholds that correspond to business rhythms for that provider are determined by setting the real thresholds at a value at which 10% of the future metric values are expected to surpass.

For example, if a business rhythm defined for a metric's statistical mean for a particular time period is 10, with a 90% standard deviation of +3/−2, then thresholds for a comparable time period can be set at 8 and 13. Consequently, in monitoring the performance of a corresponding business service, when a value for the metric during that comparable time period is either less than (or, less than or equal to) 8 or greater than (or, greater than or equal to) 13, then a significant variance has occurred and an associated action may be triggered. Use of multiple threshold values for a given metric is described herein in reference to an advisory mode of use.

For detecting variations in which the values of the metric for the time period (window) is such that it appears to be closer to a cluster group not associated with the time window, an appropriate threshold can be based on the degree of deviation of a ratio of the distances from the typical group to the other group. For example, let a business rhythm define the metric's behavior in a time window to be in group $C_i$. Let the distance of the metric's distribution associated with the time window from the representative distribution of group $C_i$, be $d_{ci}$. Let the distance of the metric's distribution associated with the time window from the representative distribution of any other group $C_{j[j \neq i]}$, be $d_{cj[j \neq i]}$. Let the ratio $\alpha$ be given by $\alpha = d_{ci}/d_{cj[j \neq i]}$. Assume that the value of $\alpha$ is configured to 1.1 (e.g., by the business service provider) as a reasonable and useful level for triggering an action in response to detecting a value that surpasses a theoretical threshold. In other words, that provider is not interested in reacting to a change in rhythm unless the metric behavior diverges significantly such that the behavior of the metric is such that it is closer to the new group $C_j$ by an amount that is 91% of its closeness to its "normal" group C.

Rhythm Monitoring Engine

According to one embodiment, the rhythm monitoring engine 412 (FIG. 4) monitors metric values at real time and generates two types of alerts. The alert type depends on the kind of deviations observed in the metric values. The two kinds of deviations monitored are (1) deviations resulting in a change of rhythm; and (2) deviations localized to particular time windows, described in greater detail as follows.

For deviations resulting in a change of rhythm, the 1-hour distribution measured during runtime deviates from the classification associated with the time window. For example, consider a 1-hour time-window (Monday: 9 am-10 am) that had been classified by the last rhythm extraction to be in cluster C1. Let $d_{c1}$ and $d_{c2}$ be the measure of the typical distance of the metric distribution in the 1-hour from the representative distributions of clusters C1 and C2, respectively. For this rhythm, the rhythm monitor engine keeps track of the quantity $\alpha = d_{c1}/d_{c2}$. In real-time, at time 10 am, the rhythm monitor engine computes the run time distances $d_{c1(t=10)}$ and $d_{c2(t=10)}$ and $\alpha_{(t=10)} = d_{c1(t=10)}/d_{c1(t=10)}$. If $\alpha_{(t=10)}$ exceeds the establishes threshold then the engine determines that a change in the rhythm has occurred.

For deviations localized to particular time windows, this type of violation occurs when the current value of the metric violates a threshold derived from the distribution of the historical metric values for that time window. For example, assume for the time window (Monday: 9 am-10 am) the distribution of the metric is already stored in the statistically compressed format, and assume the user configured the threshold for that time window to be $\mu+2\sigma$. Therefore, for this window, whenever the metric value exceeds $\mu+2\sigma$ there is a localized deviation and an alert is generated. According to one embodiment, the system allows the user to specify four levels of alerts: SEVERE, WARN, CRITICAL and CLEAR. For each level, the user can associate a threshold value (or values) that is a function of the distribution computed for that time window.

Multiple threshold levels can be set for a given business rhythm metric, in association with different actions that are to be responsively performed. That is, an advisory procedure can be implemented, in which multiple threshold zones are established in association with respective thresholds. For example, zones referred to as CLEAR, WARN, SEVERE, CRITICAL, and the like, may be defined with respective thresholds set in increasing order, such as a 10% probability level is associated with WARN, a 8% probability level is associated with SEVERE, and a 5% probability level is associated with CRITICAL, and so on. Continuing the example, when a value for the metric surpasses the WARN threshold, an e-mail alert is automatically sent to a business service manager; when a value surpasses the SEVERE threshold, an e-mail is automatically sent to an IT administrator; and when a value surpasses the CRITICAL threshold, an e-mail alert and a page is sent to an IT manager.

Figure 6A:
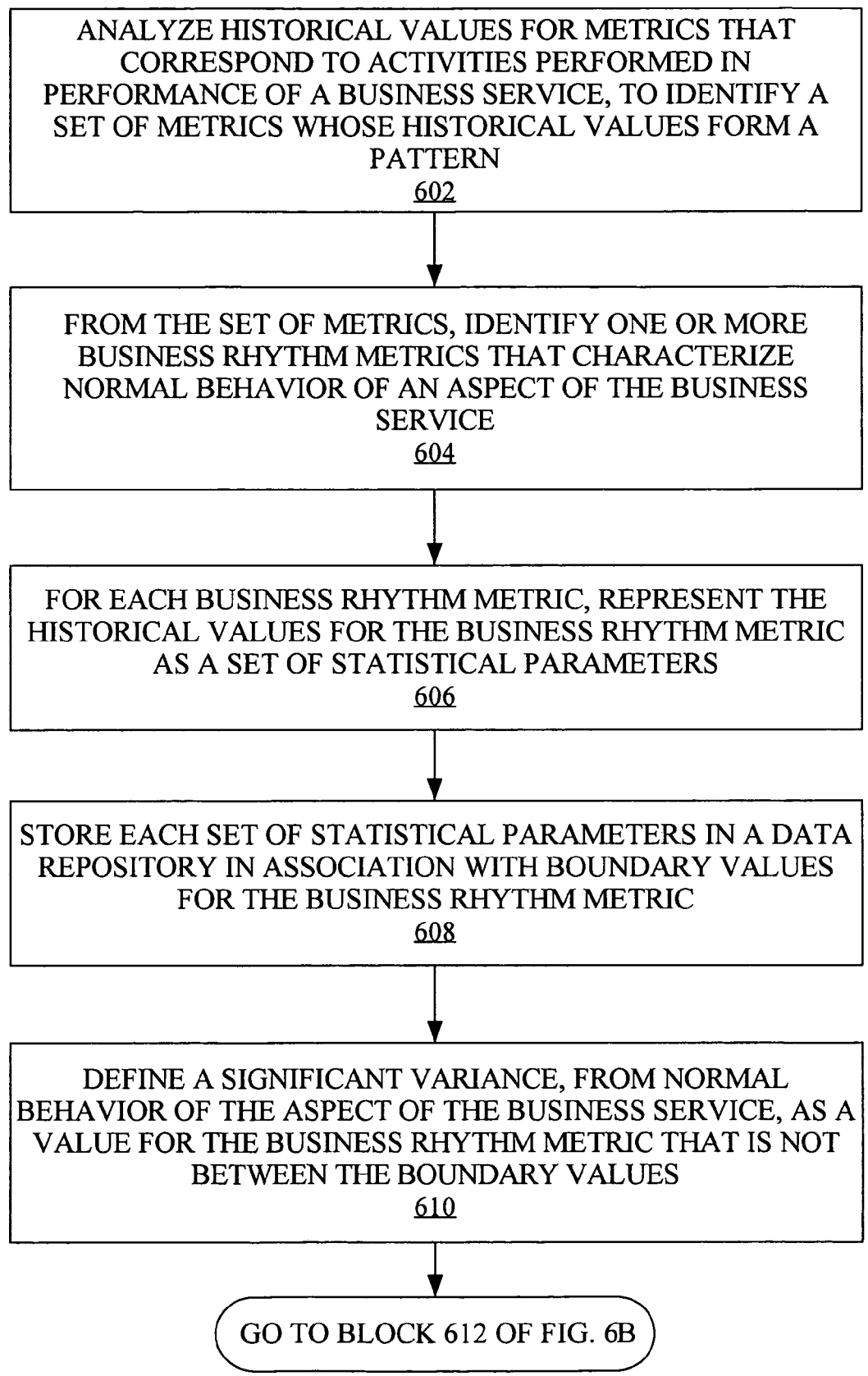
FIG. 6A is a flow diagram that illustrates a method for characterizing the operational behavior of a web-enabled business service, according to an embodiment of the invention.

A Method for Characterizing the Operational Behavior of a Web-Enabled Business Service FIG. 6A is a flow diagram that illustrates a method for characterizing the operational behavior of a business service, such as a network-based business service, according to an embodiment of the invention. The method illustrated in FIG. 6A is performed electronically rather than manually, such as by a software application or module (e.g., rhythm extraction engine 408 of FIG. 4) executing on a conventional computing system, such as computer system 800 of FIG. 8. Each of the blocks depicted in FIG. 6A are described in detail at various locations herein.

At block 602, historical values for metrics that correspond to activities that are performed in performance of a business service, are analyzed to identify a set of one or more metrics whose historical values form a pattern. For example, data collectors 402 (FIG. 4) intercept network traffic going into and coming out of the server 204 (FIG. 2) that hosts application 108 (FIG. 1), which collectively provide the business service being monitored. The historical values for the metrics can be analyzed for different time periods and for different durations to try to identify patterns.

At block 604, one or more business rhythm metrics are identified from the set of metrics. The business rhythm metrics that are identified are utilized to characterize normal behavior of an aspect of the operational performance of the business service. As described above, the metrics that are considered useful business rhythm metrics either (a) have historical values that tend toward relatively small dispersions, and with relatively low probabilities that specified threshold values will be surpassed; and/or (b) their temporal behavior can be classified into distinct groups.

The aspect of the business service that is characterized by a given business rhythm is related to, or defined by, the metrics that correspond to business activities that correspond to the business rhythm. The term "aspect" is used to generally describe a business process that the corresponding business activity metrics represent to an interested party, such as the business service provider.

At block 606, the historical values for each business rhythm metric are represented as a set of statistical parameters and, at block 608, each set of statistical parameters is stored in a data repository. In one embodiment, a business rhythm is partitioned by intervals and/or durations of time, with associated sets of representative statistical parameters stored in the data store, such as in an array or a grid data structure. Thus, different array elements or grid cells can be readily compared to gain insight into the behavior of the operational performance of the business service. As discussed, the historical values for a business rhythm metric may be statistically compressed by representing each time interval of the corresponding business rhythm.

In one embodiment, at block 608, each set of statistical parameters is stored in a data repository in association with one or more threshold values (also referred to herein as boundary values) for the corresponding business rhythm metric.

At block 610, a significant variance from the normal behavior of the aspect of the business service is defined as a value, for the corresponding business rhythm metric, that is not between the boundary values. Hence, the real-time operational performance of a business service can be monitored in view of the established business rhythms that correspond to the business service. Variances in what is considered normal behavior of the service may be readily detected by monitoring real-time values for metrics for business activities that correspond to the service.

Each metric on which business rhythms are based is expected to behave normally with a certain degree of variation. However, "significant variances" are of interest to a business service provider. A significant variance in a business rhythm, and, therefore, in the operational performance of a corresponding business service, is a variance that exceeds or surpasses a particular pre-defined threshold. As mentioned, multiple levels of significant variances can be defined for a given business rhythm, based on corresponding threshold values and in association with corresponding responsive actions.

A good process for defining a significant variance for a business rhythm considers a number of issues. These issues include, for example, (a) with what should the monitored metric values be compared, e.g., with another value or with an output value from a function computed based on the metric's value, etc.; (b) what is the normal operational behavior for the business service, e.g., based on the dispersion for the metric; (c) what are normal, or expected, disturbances or variances in the operational behavior for the business service, e.g., based on the context in which the business service is operating at any given time; and (d) the type of statistic to use in defining a business rhythm and, likewise, a significant variance in such rhythm.

Figure 6B:
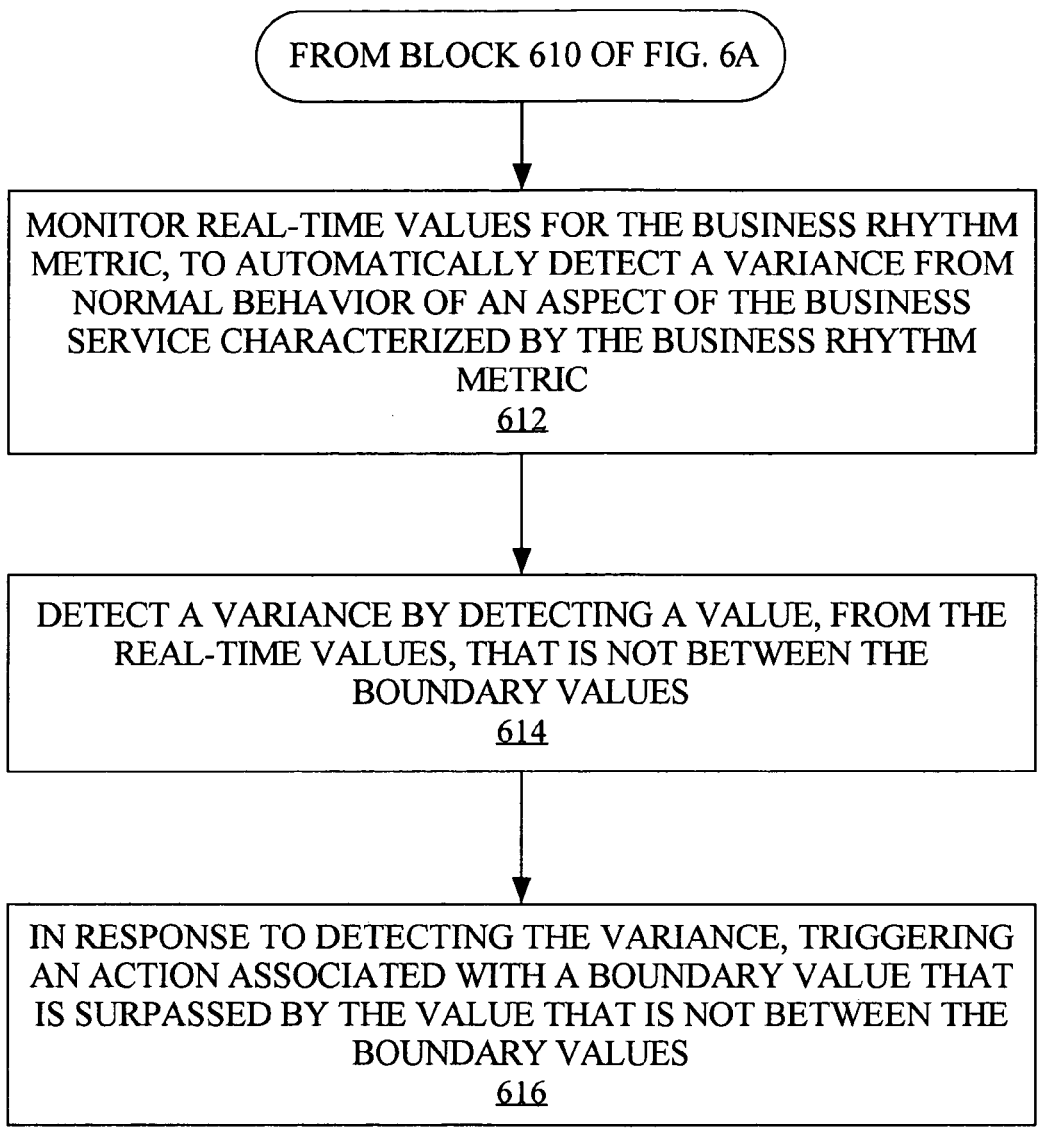
FIG. 6B is a flow diagram that illustrates a method for monitoring the behavior of a web-enabled business service, according to an embodiment of the invention.

A Method for Monitoring the Operational Behavior of a Web-Enabled Business Service FIG. 6B is a flow diagram that illustrates a method for monitoring the behavior of a business service, such as a network-based or web-enabled business service, according to an embodiment of the invention. The method illustrated in FIG. 6B is performed electronically rather than manually, such as by a software application or module (e.g., rhythm monitoring engine 412 of FIG. 4) executing on a conventional computing system, such as computer system 800 of FIG. 8. Each of the blocks depicted in FIG. 6B are described in detail at various locations herein. The method illustrated in FIG. 6B is, in one embodiment, an optional extension of the method illustrated in FIG. 6A. However, the method illustrated in FIG. 6B may rely on a different characterization of normal operational behavior of a business service, and variances from that normal behavior, than is illustrated in FIG. 6A.

At block 612, real-time values for a business rhythm metric are monitored to automatically detect a variance from the normal behavior of an aspect of the business service that is characterized by the business rhythm metric. For example, rhythm monitoring engine 412 (FIG. 4) accesses data output from aggregator 404 (FIG. 4), as described in greater detail herein.

At block 614, a variance from the normal behavior of the aspect of the business service is detected by detecting a value, from the real-time values for the business rhythm metric, that is not between the boundary values, i.e., threshold values. At block 616, in response to detecting a variance, an action is triggered. For example, an e-mail alert may be triggered, or a record written to a report file, or the like.

Monitoring use patterns, i.e., via monitoring of the performance of business activities that correspond to business services, to gain insight as to how a service is being provided, can be applied at an IT infrastructure level as well as at a business activity level. For a non-limiting example of a use in monitoring an IT infrastructure, web server infrastructures using banks of machines can be monitored. First, the machines are monitored to discover business rhythms associated with the mean operational performance of the bank of machines. Next, the machines are monitored to detect any abnormalities in the performance of any given machine from the bank of machines, based on significant variances from the mean operational performance of the bank as characterized by the business rhythms.

The techniques described herein can be implemented, for example, in web-based electronic commerce environments as well as in enterprise environments. These techniques provide a mechanism for monitoring and managing business resources at a higher level of abstraction than at the actual resource level or at a packet level, which may not be very insightful with regards to patterns of usage over time. Rather, these techniques provide tools for making business decisions based on a more global and long-term view of the performance of the environment or infrastructure being monitored, based on the normal operational behavior of the environment and any significant variances therefrom.

Example Use Case

Usage of embodiments of the invention is described in the context of an example. In this example, a particular business process is defined by a set of particular process states, and each process state may be specified by a well-defined business signature. If an HTTP traffic hit (e.g., HTTP request, HTTP response) matches a particular business signature, then the execution path is supposed to be in the process state associated with that particular business signature. A subset of these process states has a well-defined set of metrics. The measure of the runtime performance of the process is given by a function of the metrics of the process states.

Figure 7:
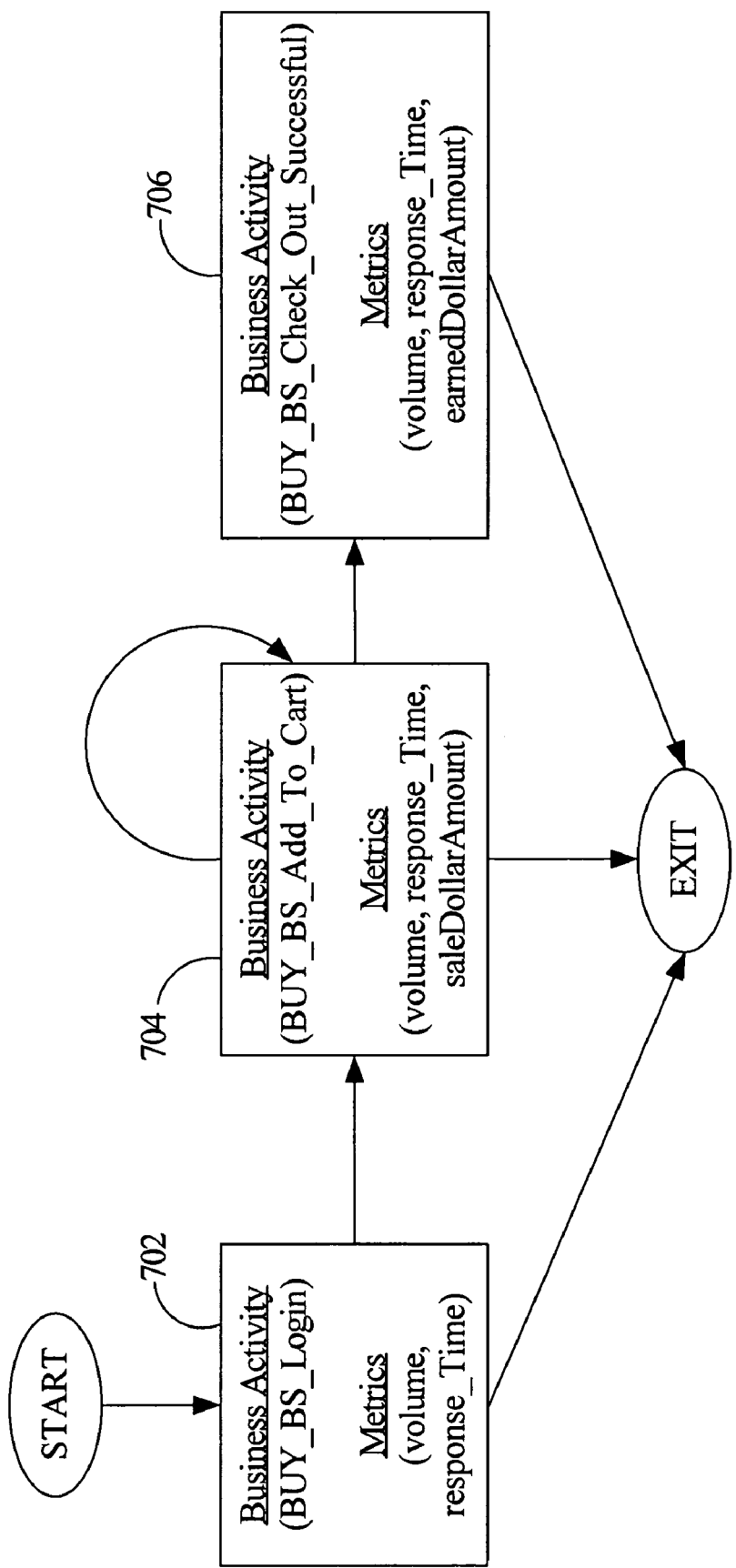
FIG. 7 is a block diagram that illustrates the model of a business process, BUY_BS, for purposes of an example.

FIG. 7 is a block diagram that illustrates the model of a business process, BUY_BS, for purposes of this example. The process BUY_BS is a process for buying items online, and is composed of the following three process states associated with respective business activities: BUY_BS_Login 702, BUY_BS_Add_To_Cart 704 and BUY_BS_Check_Out_Successful 706.

(1) BUY_BS_Login 702: State of the process that represents a user logging on to the system.

BUY_BS_Login:Metrics is a set of metrics associated with BUY_BS_Login, where the set members are (a) BUY_BS_Login::<volume> measures the number of logins; and (b) BUY_BS_Login::<responseTime> measures the time taken to complete a login.

(2) BUY_BS_Add_To_Cart 704: State of the process that represents the user adding some items to a shopping cart.

BUY_BS Add_To Cart:Metrics is a set of metrics associated with BUY_BS Add_To_Cart, where the set members are
  (a) BUY_BS_Add_To_Cart::<volume> measures the number of "add-to-cart" operations;
  (b) BUY_BS_Add_To_Cart::<responseTime> measures the time taken to complete an "add-to-cart" operation; and
  (c) BUY_BS_Add_To_Cart::<saleDollarAmount> measures the dollar amount of a potential sale.

(3) BUY_BS_Check_Out_Successful 706: State of the process that represents the user checking out items in the shopping cart.

BUY_BS_Check_Out_Successful is a set of metrics associated with BUY_BS_Check_Out_Successful, where the set members are
  (a) BUY_BS_Check_Out_Successful::<volume> measures the number of successful "check outs";
  (b) BUY_BS_Check_Out_Successful::<responseTime> measures the time taken to complete a "check out"; and
  (c) BUY_BS_Check_Out_Successful::<earnedDollarAmount> measures the dollar amount realized due to the sale.

The interpretation of the value of the metrics associated with process states depends on the user. For example, a business manager may find the following metrics in the process BUY_BS useful to monitor the business process.
  (a) BUY_BS_Login::<volume>=number of users logged in for buying, where a higher the value is better;
  (b) BUY_BS_Add_To_Cart::<volume>=number of items being added to the carts, where a higher value is better;
  (c) BUY_BS_Check_Out_Successful::<volume>=number of actual sales made, where a higher value is better;
  (d) BUY_BS_Add_To_Cart::<saleDollarAmount>=the value of the items ready for check out, where a higher value is better;
  (e) BUY_BS_Check_Out_Successful::<earnedDollarAmount>=the value of the items checked out, where a higher value is better;
  (f) ratio(BUY_BS_Check_Out_Successful::<volume>, BUY_BS_Login::<volume>)=an estimate of the percentage of customers that came to site and completed a transaction, where a business would like this value to be close to 1.0;
  (g) 1-ratio(BUY_BS_Check_Out_Successful::<earnedDollarAmount>, BUY_BS Add_To_Cart::<saleDollarAmount>)=an estimate of the percentage of potential earnings in dollars lost, where a business would like this value to be close to 0.0;
  (h) BUY_BS_Login::<responseTime>=a measure of customer service quality;
  (i) BUY_BS_Add_To_Cart::<responseTime>=a measure of customer service quality;
  (j) BUY_BS_Check_Out_Successful::<responseTime>=a measure of customer service quality.

On the other hand, an IT manager may find the following metrics in the process BUY_BS useful to monitor the health of the service delivered by the infrastructure.
  (a) BUY_BS_Login::<volume>=the number of users accessing the web site and accessing the infrastructure supporting the login application or module;
  (b) BUY_BS_Add_To_Cart::<volume>=the number of users accessing the web site and accessing the infrastructure supporting the add_to_cart application or module;
  (c) BUY_BS_Check_Out_Successful::<volume>=the number of users accessing the web site and accessing the infrastructure supporting the checkout and shipping service application or module;
  (d) BUY_BS_Login::<responseTime>=a measure of the performance of the infrastructure;
  (e) BUY_BS_Add_To_Cart::<responseTime>=a measure of the performance of the infrastructure; and
  (f) BUY_BS_Check_Out_Successful::<responseTime>=a measure of the performance of the infrastructure.

Because a business process is dynamic in nature, the values of the process state metrics are a function of time, i.e., the value of each metric varies with time. The notation <processStateName::<metricName>(t) is used to denote the value of the metric at time t. For example, the value of the metric BUY_BS_Check_Out_Successful::<responseTime> at time t is denoted by BUY_BS_Check_Out_Successful::<responseTime>(t).

The following is an example of how business rhythms are discovered and used to monitor a business process. Let averageResponseTime be the average response time of all the hits on the site. Consider a deployment in which it is desirable to check the metric averageResponseTime for exhibition of a business rhythm and to quantify the rhythm if there is one. According to an embodiment, the following may occur:
  (a) historical values of the metric averageResponseTime stored in the circular data stored are periodically are mined;
  (b) the existence of two cluster groups peak_TWS and off-peak_TWS, are discovered such that averageResponseTime seen during all the time periods in peak_TWS are statistically similar but statistically different from the values seen during all the time periods in off-peak_TWS.

Assuming the time window sets peak_TWS and off-Peak_TWS have been discovered in step (b), the process then determines the distribution of the values in the set peak_TWS and off-peak_TWS. In this case, by the central limit theorem, the distribution of averageResponseTime is normal. Let the distribution ($\mu$, $\sigma$) of peak_TWS be N(5 seconds, 2) and the distribution of off-peak_TWS be N(1 second, 2). The process then outputs the following quantification for the rhythm: The rhythm has two time window sets {peak_TWS, off-peak_TWS}, and the distribution of peak_TWS is N(5 seconds, 2) and the distribution of off-peak_TWS be N(1 seconds, 2).

The rhythm monitoring engine 412 (FIG. 4) compares, in real-time, the values of the averageResponseTime and determines whether or not the values meet the foregoing similarity quantification criteria specified. If the metric does not meet those criteria, the inference is that the rhythm of the process has been disturbed and alerts are generated.

Hardware Overview

Figure 8:
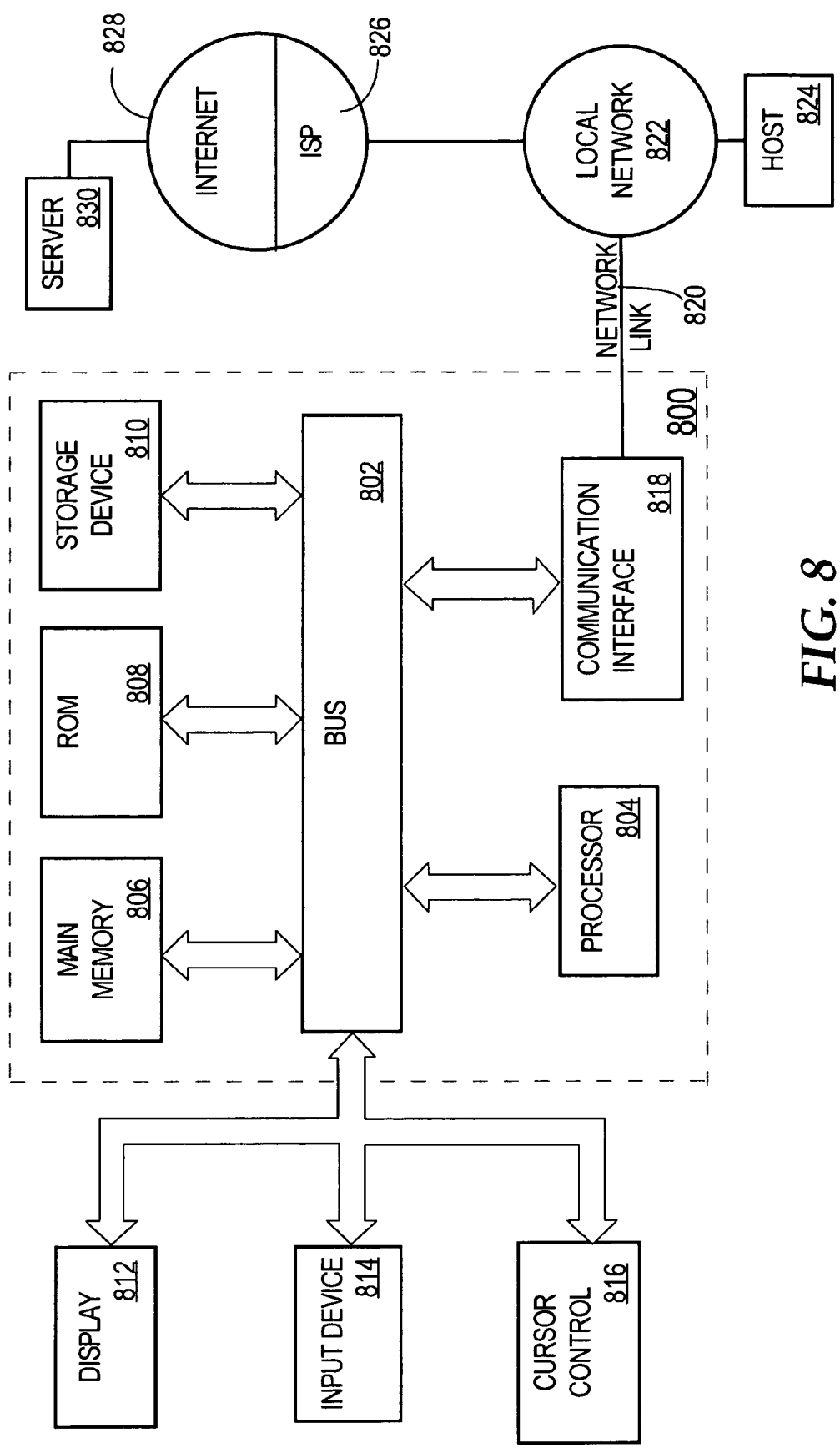
FIG. 8 is a block diagram that illustrates a computer system upon which an embodiment of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Embodiments of the invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for monitoring a business service, the method comprising the steps of:
    analyzing historical data for a first set of metrics, wherein each metric of said first set of metrics corresponds to one or more activities related to the performance of the business service;
    based on said historical data, selecting a second set of metrics from the first set of metrics, wherein each metric in the second set of metrics is selected from the first set of metrics because historical data for the metric exhibits one or more repeating patterns; and from the second set of metrics, selecting one or more metrics to be one or more business rhythm metrics;

wherein said one or more business rhythm metrics are metrics that characterize normal behavior of an aspect of the business service;

wherein selecting the one or more business rhythm metrics comprises: a) ranking each particular metric of the second set of metrics based on statistical characteristics of the one or more repeating patterns for the particular metric; and b) selecting the one or more business rhythm metrics based on the ranking;

monitoring the one or more business rhythm metrics for variances in the normal behavior of the aspect of the business service, as represented by the one or more repeating patterns exhibited by the one or more business rhythm metrics;

in response to detecting a variance in the normal behavior of the aspect of the business service, as evidenced by values obtained for the one or more business rhythm metrics during the monitoring, triggering an action;

wherein the method is performed by one or more computing devices.

2. The method of claim 1, said monitoring comprising:

extracting values for the business rhythm metrics from network traffic associated with said one or more activities.

3. The method of claim 1, further comprising the step of:

in response to identifying a particular business rhythm metric, storing data indicating a business rhythm for the particular business rhythm metrics, said data representing each particular pattern of the one or more repeating patterns for the particular business rhythm metric;

wherein, for each particular pattern, said data indicating each particular pattern includes data indicating (a) a set of time ranges in which the particular pattern occurs, and (b) one or more sets of statistical parameters representative of the historical data for the particular business rhythm metric for said set of time ranges.

4. The method of claim 3, further comprising the step of:

storing boundary values in association with each of the one or more sets of statistical parameters; and wherein monitoring the one or more business rhythm metrics comprises:

monitoring real-time or near real-time values for the business rhythm metric, detecting a particular value, from the real-time or near real-time values, that is outside of the boundary values; and in response to detecting the particular value, triggering the action, wherein the action is associated with the boundary values.

5. The method of claim 1, wherein the one or more business rhythm metrics include a compound metric that is a ratio of metrics.

6. The method of claim 1, further comprising the steps of:

partitioning the historical data for a business rhythm metric into temporal fragments;

representing each fragment as a set of statistical parameters; and storing each set of statistical parameters in a data repository.

7. The method of claim 6, further comprising the steps of:

comparing a first set of statistical parameters that represents a first fragment with one or more second sets of statistical parameters that represent one or more respective second fragments; and based on the step of comparing, identifying a relationship between behavior characterized by the first fragment and behavior characterized by a second fragment.

8. The method of claim 7, wherein the first fragment is a fragment of a first metric and the second fragment is a fragment of the same first metric.

9. The method of claim 7, wherein the first fragment is a fragment of a first metric and the second fragment is a fragment of a second metric that is a different metric than the first metric.

10. The method of claim 7, further comprising the steps of:

storing, in a data repository, an association between the first fragment and the second fragment that characterizes the relationship as normal behavior of an aspect of the business service.

11. The method of claim 1, further comprising gathering said historical data, wherein gathering said historical data comprises:

monitoring metric values over multiple time ranges to determine, for each of the multiple time ranges, a set of metric values; and generating compressed representations of the metric values for each of the multiple time ranges, wherein each of said compressed representation comprises statistical data representative of the set of metric values for the time range associated with the compressed representation;

wherein analyzing said historical data comprises analyzing said compressed representations in place of metric values.

12. A method for monitoring a business service, the method comprising the steps of:

accessing historical data for a business activity metric, said historical data being partitioned into multiple data sets based on time ranges;

for each data set of the multiple data sets, determining a statistical distribution of the data set;

classifying at least a portion of the multiple data sets into groups of similarity, wherein, for each respective group of similarity, data sets are classified into the group of similarity because they have similar statistical distributions; and based on said classifying, storing business rhythm data representing a business rhythm for the business activity metric;

for each group of similarity, storing data that indicates the statistical distributions of the data in the group's data set;

monitoring the business activity metric for deviations from the business rhythm as indicated by said business rhythm data;

in response to detecting a deviation from the business rhythm, triggering an action;

monitoring real-time or near real-time data for said business activity metric for a particular time range;

classifying said data for said particular time range into a first group of similarity of said groups of similarity;

determining that the first group is not the same as a second group to which a data set for a corresponding similar time range was classified, as indicated by said business rhythm data;

in response to said step of determining, identifying a variance in the normal operational behavior of the business service;

wherein the method is performed by one or more computing devices.

13. The method of claim 12, further comprising the step of: determining the time ranges based on a dispersion of the historical data over a period of time.

14. The method of claim 12, further comprising the step of: comparing real-time or near real-time values for said business activity metric for a particular time range with corresponding historical data for a corresponding similar time range, to automatically detect a variance in the normal operational behavior of the business activity for that particular time range.

15. The method of claim 12,
wherein the step of accessing includes accessing historical data associated with a particular user; and
wherein the step of classifying at least a portion of the data sets includes classifying the historical data associated with the particular user into groups of similarity for the particular user.

16. The method of claim 12,
wherein the step of accessing includes accessing historical data associated with an aggregation of users; and
wherein the step of classifying at least a portion of the data sets includes classifying the historical data associated with the aggregation of users into groups of similarity for the aggregation of users.

17. The method of claim 12, wherein each of said multiple data sets is a compressed data set, each compressed data set comprising statistical data derived from a corresponding larger set of metric values observed during a time range corresponding to the compressed data set.

18. The method of claim 12, wherein the business rhythm data comprises, for each data set that is classified into a group of similarity, a group identifier identifying the group of similarity into which the data set was classified.

19. One or more non-transitory storage media storing instructions which, when executed by one ore more computing devices, cause performance of:
analyzing historical data for a first set of metrics, wherein each metric of said first set of metrics corresponds to one or more activities related to the performance of a business service;
based on said historical data, selecting a second set of metrics from the first set of metrics, wherein each metric in the second set of metrics is selected from the first set of metrics because historical data for the metric exhibits one or more repeating patterns; and
from the second set of metrics, selecting one or more metrics to be one or more business rhythm metrics;
wherein said one or more business rhythm metrics are metrics that characterize normal behavior of an aspect of the business service;
wherein selecting the one or more business rhythm metrics comprises: a) ranking each particular metric of the second set of metrics based on statistical characteristics of the one or more repeating patterns for the particular metric; and b) selecting the one or more business rhythm metrics based on the ranking;
monitoring the one or more business rhythm metrics for variances in the normal behavior of the aspect of the business service, as represented by the one or more repeating patterns exhibited by the one or more business rhythm metrics;
in response to detecting a variance in the normal behavior of the aspect of the business service, as evidenced by values obtained for the one or more business rhythm metrics during the monitoring, triggering an action.

20. The one or more non-transitory storage media of claim 19, wherein the instructions, when executed by the one or more computing devices, further cause performance of: extracting values for the business rhythm metrics from network traffic associated with said one or more activities.

21. The one or more non-transitory storage media of claim 19, wherein the instructions which when executed by the one or more computing devices, further cause performance of: in response to identifying a particular business rhythm metric, storing data indicating a business rhythm for the particular business rhythm metrics, said data representing each particular pattern of the one or more repeating patterns for the particular business rhythm metric;
wherein, for each particular pattern, said data indicating each particular pattern includes data indicating (a) a set of time ranges in which the particular pattern occurs, and (b) one or more sets of statistical parameters representative of the historical data for the particular business rhythm metric for said set of time ranges.

22. The one or more non-transitory storage media of claim 21, wherein the instructions which when executed by the one or more computing devices, further cause performance of: storing boundary values in association with each of the one or more sets of statistical parameters; and
wherein monitoring the one or more business rhythm metrics comprises: monitoring real-time or near real-time values for the business rhythm metric, detecting a particular value, from the real-time or near real-time values, that is outside of the boundary values; and
in response to detecting the particular value, triggering the action, wherein the action is associated with the boundary values.

23. The one or more non-transitory storage media of claim 19, wherein the one or more business rhythm metrics include a compound metric that is a ratio of metrics.

24. The one or more non-transitory storage media of claim 19, wherein the instructions, when executed by the one or more computing devices, further cause performance of: partitioning the historical data for a business rhythm metric into temporal fragments;
representing each fragment as a set of statistical parameters; and storing each set of statistical parameters in a data repository.

25. The one or more non-transitory storage media of claim 24, wherein the instructions, when executed by the one or more computing devices, further cause performance of: comparing a first set of statistical parameters that represents a first fragment with one or more second sets of statistical parameters that represent one or more respective second fragments; and
based on the step of comparing, identifying a relationship between behavior characterized by the first fragment and behavior characterized by a second fragment.

26. The one or more non-transitory storage media of claim 25, wherein the first fragment is a fragment of a first metric and the second fragment is a fragment of the same first metric.

27. The one or more non-transitory storage media of claim 25, wherein the first fragment is a fragment of a first metric and the second fragment is a fragment of a second metric that is a different metric than the first metric.

28. The one or more non-transitory storage media of claim 25, wherein the instructions, when executed by the one or more computing devices, further cause performance of: storing, in a data repository, an association between the first fragment and the second fragment that characterizes the relationship as normal behavior of an aspect of the business service.

29. The one or more non-transitory storage media of claim 19, wherein the instructions, when executed by the one or more computing devices, further cause performance of gathering said historical data, wherein gathering said historical data comprises: monitoring metric values over multiple time ranges to determine, for each of the multiple time ranges, a set of metric values; and generating compressed representations of the metric values for each of the multiple time ranges, wherein each of said compressed representation comprises statistical data representative of the set of metric values for the time range associated with the compressed representation: wherein analyzing said historical data comprises analyzing said compressed representations in place of metric values.

30. One or more storage non-transitory media storing instructions, when executed by one or more computing devices, cause performance of: accessing historical data for a business activity metric, said historical data being partitioned into multiple data sets based on time ranges;

for each data set of the multiple data sets, determining a statistical distribution of the data set;

classifying at least a portion of the multiple data sets into groups of similarity, wherein, for each respective group of similarity, data sets are classified into the group of similarity because they have similar statistical distributions; and based on said classifying, storing business rhythm data representing a business rhythm for the business activity metric;

for each group of similarity, storing data that indicates the statistical distributions of the data in the group's data set: monitoring the business activity metric for deviations from the business rhythm as indicated by said business rhythm data;

in response to detecting a deviation from the business rhythm, triggering an action;

monitoring real-time or near real-time data for said business activity metric for a particular time range;

classifying said data for said particular time range into a first group of similarity of said groups of similarity;

determining that the first group is not the same as a second group to which a data set for a corresponding similar time range was classified, as indicated by said business rhythm data;

in response to said step of determining, identifying a variance in the normal operational behavior of the business service.

31. The one or more non-transitory storage media of claim 30, wherein the instructions, when executed by the one or more computing devices, further cause performance of: determining the time ranges based on a dispersion of the historical data over a period of time.

32. The one or more non-transitory storage media of claim 30, wherein the instructions, when executed by the one or more computing devices, further cause performance of: comparing real-time or near real-time values for said business activity metric for a particular time range with corresponding historical data for a corresponding similar time range, to automatically detect a variance in the normal operational behavior of the business activity for that particular time ranges.

33. The one or more non-transitory storage media of claim 30, wherein said accessing includes accessing historical data associated with a particular user; and wherein said classifying at least a portion of the data sets includes classifying the historical data associated with the particular user into groups of similarity for the particular user.

34. The one or more non-transitory storage media of claim 30 wherein said accessing includes accessing historical data associated with an aggregation of users; and wherein said classifying at least a portion of the data sets includes classifying the historical data associated with the aggregation of users into groups of similarity for the aggregation of users.

35. The one or more non-transitory storage media of claim 30, wherein each of said multiple data sets is a compressed data set, each compressed data set comprising statistical data derived from a corresponding larger set of metric values observed during a time range corresponding to the compressed data set.

36. The one or more non-transitory storage media of claim 30, wherein the business rhythm data comprises, for each data set that is classified into a group of similarity, a group identifier identifying the group of similarity into which the data set was classified.

* * * * *